United States Patent
Sinden et al.

(10) Patent No.: US 7,300,004 B2
(45) Date of Patent: *Nov. 27, 2007

(54) TRAVELING SPRINKLER INCORPORATING AUTOMATIC WATER SUPPLY VALVE DOCKING STATION

(75) Inventors: Joseph Daniel Sinden, Walla Walla, WA (US); Rex Daniel Ness, Walla Walla, WA (US); Chad Daniel Leinweber, Walla Walla, WA (US); Richard John Berrier, Walla Walla, WA (US); Craig Nelson, Walla Walla, WA (US); Barton R. Nelson, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 199 days.

This patent is subject to a terminal disclaimer.

(21) Appl. No.: 10/921,296

(22) Filed: Aug. 19, 2004

(65) Prior Publication Data

US 2005/0077401 A1    Apr. 14, 2005

Related U.S. Application Data

(60) Provisional application No. 60/496,902, filed on Aug. 22, 2003.

(51) Int. Cl.
*B05B 3/00* (2006.01)
*B05B 3/18* (2006.01)
*A01G 25/09* (2006.01)

(52) U.S. Cl. ............... 239/722; 239/723; 239/735; 239/743; 239/749; 239/146; 239/147; 239/148; 169/24; 169/52

(58) Field of Classification Search .............. 239/722, 239/723, 735, 743, 749, 741, 146, 147, 148; 169/52, 24; 137/272, 291; 251/291, 292
See application file for complete search history.

(56) References Cited

U.S. PATENT DOCUMENTS

| | | | |
|---|---|---|---|
| 1,142,448 A | 6/1915 | Lord |
| 1,651,582 A | 12/1927 | Buckner |
| 1,984,531 A | 12/1934 | Kind et al. |
| 2,122,079 A | 6/1938 | Wilson |
| 2,474,071 A | 6/1949 | Stetson |
| 2,750,228 A | 6/1956 | Engel |
| 3,321,138 A | 5/1967 | Curry |
| 3,444,941 A | 5/1969 | Purtell |
| 3,463,175 A | 8/1969 | Rogers |
| 3,575,200 A | 4/1971 | Imeson |
| 3,592,220 A | 7/1971 | Reinke |
| 3,608,825 A | 9/1971 | Reinke |

(Continued)

FOREIGN PATENT DOCUMENTS

CA           924353          4/1973

(Continued)

*Primary Examiner*—Davis D. Hwu
(74) *Attorney, Agent, or Firm*—Nixon & Vanderhye, PC

(57) ABSTRACT

A docking station module for fluidly connecting a mobile irrigation apparatus to a stationary hydrant water supply valve mounted on a water supply pipe, the module comprising a hydrant valve actuator resiliently suspended from a frame for floating movement in at least three mutually substantially perpendicular directions relative to the hydrant water supply valve.

75 Claims, 31 Drawing Sheets

U.S. PATENT DOCUMENTS

| | | | |
|---|---|---|---|
| 3,608,827 A | 9/1971 | Kinkead | |
| 3,679,135 A | 7/1972 | Grosch | |
| 3,710,818 A | 1/1973 | Imeson | |
| 3,729,016 A | 4/1973 | Von Linsowe | |
| 3,729,141 A | 4/1973 | Cornelius | |
| 3,741,238 A | 6/1973 | Lacey | |
| 3,970,102 A | 7/1976 | Harvey | |
| 3,972,477 A * | 8/1976 | Laureau | 239/749 |
| 3,984,052 A | 10/1976 | Di Palma | |
| 4,003,519 A | 1/1977 | Kruse et al. | |
| 4,036,436 A | 7/1977 | Standal | |
| 4,182,493 A | 1/1980 | Murray | |
| 4,192,335 A | 3/1980 | Standal | |
| 4,204,642 A | 5/1980 | Hunter | |
| 4,240,461 A | 12/1980 | Harvey | |
| 4,252,275 A | 2/1981 | Standal | |
| 4,265,404 A | 5/1981 | Hunter | |
| 4,274,584 A | 6/1981 | Noble | |
| 4,295,607 A | 10/1981 | Noble | |
| 4,350,295 A | 9/1982 | Gheen | |
| 4,412,655 A | 11/1983 | Noble | |
| 4,413,783 A | 11/1983 | Ostrom et al. | |
| 4,421,274 A | 12/1983 | Noble | |
| 4,442,974 A | 4/1984 | Noble | |
| 4,442,976 A | 4/1984 | Noble | |
| 4,489,888 A | 12/1984 | Rinkewich | |
| 4,522,338 A | 6/1985 | Williams | |
| 4,553,699 A | 11/1985 | Bengtsson | |
| 4,561,459 A * | 12/1985 | Jackman | 137/291 |
| 4,682,736 A | 7/1987 | Wieck | |
| 4,730,773 A | 3/1988 | Meyer | |
| 4,809,910 A | 3/1989 | Meyer | |
| 4,811,248 A * | 3/1989 | Senoh et al. | 700/253 |
| 4,842,204 A | 6/1989 | Debruhl, Jr. | |
| 4,877,189 A | 10/1989 | Williams | |
| 5,080,290 A | 1/1992 | Ostrom | |
| 5,340,078 A * | 8/1994 | Dean | 251/59 |
| 5,810,051 A * | 9/1998 | Campagna et al. | 137/899 |
| 6,125,868 A * | 10/2000 | Murphy et al. | 137/1 |
| 6,431,475 B1 | 8/2002 | Williams | |

FOREIGN PATENT DOCUMENTS

| | | |
|---|---|---|
| DE | 1044496 | 12/1954 |
| FR | 561667 | 10/1923 |
| GB | 2 026 293 A | 2/1980 |
| WO | WO 87/00724 | 2/1987 |

* cited by examiner

TRAVELING SPRINKLER INCORPORATING AUTOMATIC WATER SUPPLY VALVE DOCKING STATION

This application claims priority from provisional application Ser. No. 60/496,902, filed Aug. 22, 2003.

TECHNICAL FIELD

This invention relates to a traveling irrigation sprinkler, and particularly to a cart that is adapted to follow a water supply pipe, and that incorporates a docking station or module adapted to successively engage and actuate water supply valves located along the pipe.

BACKGROUND OF THE INVENTION

Traveling sprinklers that are adapted to follow an above-ground water supply pipe, and to engage in succession a number of water supply valves located along the pipe, are described in various prior patents, among them U.S. Pat. Nos. 3,575,200; 3,970,102; 3,984,052; and 4,240,461. There are other traveling irrigation machines known as "linear move" or "lateral move" machines that include large wheel-supported booms fitted with multiple sprinkler devices, where the drive tower is adapted to engage and actuate a forward supply valve before a trailing valve is disengaged so as to ensure continuous flow to the sprinklers supported on the machine. Representative examples are described in U.S. Pat. Nos. 4,442,976; 4,182,493 and 3,608,825.

The various machines described in the above patents have significant drawbacks and disadvantages, to the extent that there are few if any successful machines of this type on the market today. In fact, the most successful of the "linear move" machines are designed to draw water from a canal running alongside the field (see, for example, U.S. Pat. No. 5,080,290), or to utilize "drag hoses" that enable the machine to move from one end of the field to the other so as to eliminate the need for intermittent coupling to supply valves (see, for example, U.S. Pat. No. 4,350,295). The latter machines, however, also have drawbacks. For example, canal water is often dirty and can foul and clog the valves, sprinklers and other components. Drag hoses require constant attention and have to be relocated each time the machine reaches the end of a field.

In still other cases, complex mechanisms have been proposed for automatic docking with hydrants spaced along the length of a water supply pipe. One of the problems with these arrangements is that the hydrant risers must be held firmly in concrete, or welded onto steel pipe. In addition, alignment or docking mechanisms have been complex and costly to maintain. As a result, reliable docking under various conditions has proven to be an elusive goal. There remains, therefor, a need for a traveling sprinkler or irrigation device that moves into engagement, or docks with, and actuates, successive water supply valves located along a water supply pipe in a simple, cost-effective and reliable manner.

BRIEF DESCRIPTION OF THE INVENTION

The present invention provides, in its simplest form, a unique docking module or docking station for use with a single large-volume sprinkler on a wheeled cart that moves along an above-ground water supply pipe, and that successively docks with and actuates individual water supply valves in hydrants located along the pipe. Power to the cart drive wheels may be provided by a pair of conventional 12-volt batteries carried on the cart. A programmable logic controller (PLC), also carried on the cart, controls the movement of the cart, the speed of the cart, and both the docking and sprinkler operations.

The cart, in an exemplary embodiment, includes a frame supported on a pair of relatively large rear drive wheels and two pair of smaller front guide wheels that roll along the exposed pipe and thus guide the cart without the need for any separate steering mechanism.

The cart frame also supports a floating docking station or module that incorporates a water supply valve actuator. The docking station is adapted to engage and actuate the water supply valves in the hydrants located along the pipe. A dock stop limit switch and docking stop assembly are provided on the docking station for stopping the cart when proper alignment is achieved. The cart also supports the single, large-volume sprinkler that is in fluid communication with the water supply valve actuator.

In a first embodiment, the docking station includes a housing having a shroud with an open, inwardly tapering (in a direction opposite the direction of movement of the cart) forward end that serves to guide and align a hydrant valve actuator carried by the housing, to a position directly over a hydrant supply valve. The valve actuator includes an internal cylinder or plunger that is movable downwards into the supply valve to open the valve and allow water to flow through the plunger and through a flexible hose to the sprinkler. The sprinkler is combined with an associated control valve serving as an on/off valve for flow of water to the sprinkler nozzle.

The docking station is supported on the cart frame by means of a flexible suspension arrangement including a series of compressible tie-rods and elongated coil springs that allow the docking station housing to float, i.e., to move or flex in limited fashion in plural directions. Specifically, to ensure consistent and effective hydrant engagement, the docking station is arranged and supported so as to permit several degrees of movement as follows:

1. The docking station is resiliently suspended or hung from its supporting frame by elongated coil springs (or equivalents) extending vertically between the docking station and the cart frame to enable up and down or vertical movement, but also to facilitate front-to-back, side-to-side and compound movements, i.e., tilting and twisting movements.

2. Horizontally-oriented coil springs and/or spring-loaded, compressible tie rods (or equivalents) extend horizontally between the cart frame and docking station utilizing swivel or universal bushings to enable front-to-back horizontal movement, but also to facilitate the limited vertical, side-to-side and compound movements.

In order to further facilitate the docking operation, the hydrant itself is provided with a docking plate or flange adapted to be received and captured by the docking station. The flange, with a suitable hub, may be mounted on an existing hydrant incorporating a compatible valve, or it may be incorporated into a new water supply valve mounted on an otherwise conventional hydrant riser.

A pressure accumulator is also mounted on the cart frame and is used to supply water under pressure to the valve actuator and thereby cause the plunger to move down into the water supply valve to open the valve. The pressure accumulator is recharged with water from the supply pipe during a time delay for use with the next successive water supply valve.

In a second exemplary embodiment, the docking station assembly is designed for use with a cart adapted to be driven in either one direction, or in two opposite directions. The docking station per se in this embodiment is formed by a pair of housings sandwiched about a modified hydrant valve actuator. The two housings support multiple pairs of guide wheels adapted to engage a round plate or flange on each of the hydrants. The housings also support the docking stop assembly and related mechanical and electrical hardware for halting the movement of the cart and docking station when properly aligned with the hydrant valve, opening and closing the valve, and subsequently permitting the resumption of cart movement after an allotted sprinkling time has expired. The docking station in this embodiment has its own supporting frame that is, in turn, secured to the cart frame. The docking station or module is resiliently suspended, or hung, from its supporting frame in a manner generally similar to the first-described embodiment, but with additional vertically-oriented springs and replacement of the horizontally-oriented springs with additional tie rods. The supporting frame, in turn, supports a power supply, control panel and related hydraulic and electrical hardware as described in further detail below.

In addition to the docking station suspension mentioned above, this second embodiment may also incorporate an additional suspension feature. Specifically, the docking station and its supporting frame members may be movable as a unit laterally along a pair of rails fixed to the cart frame and extending perpendicularly to the path of movement of the cart so as to permit a wide range of lateral adjustment to accommodate a similarly wide range of hydrant misalignment situations.

In order to further facilitate the docking operation, a new hydrant design has been adopted for use with the docking station of this second embodiment. The hydrant may include a standard vertical pipe or riser fixed to the water supply pipe. At the upper end of the riser, a new valve housing is attached by any suitable means and incorporates a spring-loaded valve assembly. The upper end of the valve housing is formed with an exterior, round, horizontal flange or plate that cooperates with the docking station during capture of the hydrant. By making the flange round, the hydrant is easily approached and engaged from any direction. The valve itself projects above the top of the flange to facilitate alignment with the hydrant valve actuator on the docking station. Another alternative is the use of a conversion kit to render existing hydrants (with compatible valves) useable with the docking station.

The hydrant valve actuator carried by the docking station of this second embodiment includes a housing that incorporates a piston/cylinder, the piston portion of which is movable within an enlarged chamber in the actuator housing. "Extend" and "retract" cavities are formed on either side of (i.e., above and below) the piston portion (or simply "piston") with the assistance of a pair of rolling diaphragms attached between the piston and the actuator housing. Briefly, water under pressure introduced into the "extend" diaphragm cavity will push the piston/cylinder downwardly such that the lower edge of the cylinder will engage the hydrant valve and push it downwardly away from the valve seat to open the valve. Water can then be supplied to the sprinkler on the cart via a flexible hose connecting the valve actuator to the sprinkler. When a pre-programmed sprinkling time has expired, water under pressure introduced into the "retract" cavity will drive the piston/cylinder upwardly and back into the hydrant valve actuator, closing the valve prior to movement to the next hydrant.

In both embodiments, the various operations of the carts and docking station(s) are controlled by an appropriately pre-programmed PLC carried by the cart frame, along with solenoids that control the various mechanical movements of the components as described in detail further herein.

The cart as described engages and follows an above-ground supply pipe. The cart can also be used with underground pipe, with only the hydrants visible, and with guidance provided by wire, GPS, etc. In such cases, the front guide wheels are modified to run on the ground rather than on the supply pipe itself. In addition, for carts capable of travel in opposite directions, two pairs of vertically-oriented, angled guide wings respectively mounted on the front and back of the docking station supporting frame, along with one pair of horizontally-oriented front and back guide wings, assist in "capturing" the hydrants projecting upwardly from the underground supply pipe. In this regard, the docking station itself is also operable in opposite forward and rearward directions of movement of the cart, with no change or adjustment in any of the component parts. For single direction carts, only front guide wings are required. In this regard, and for purposes of this application, any use of "front" or "forward," etc. is intended to refer to the ends of the cart, docking station, etc. that lead in the direction of initial movement of the cart, i.e., along a path $P_1$ as shown in FIG. 1. Use of "back" or "rearward," etc. is intended to refer to the opposite ends of the cart, docking station, etc. that trail in the movement along path $P_1$.

Accordingly, in one aspect, the invention relates to a docking station module for fluidly connecting a mobile irrigation apparatus to a stationary hydrant water supply valve mounted on a water supply pipe, the module comprising a hydrant valve actuator resiliently suspended from a frame for floating movement in at least three mutually substantially perpendicular directions relative to the hydrant water supply valve.

In another aspect, the invention relates to a traveling sprinkler apparatus comprising a cart adapted for movement along a path defined by water supply pipe having a plurality of spaced hydrants thereon; a sprinkler mounted on the cart; a power source carried on the cart for moving the cart along the path; a docking station including a housing having a body portion and a valve actuator adapted for successively engaging the plurality of spaced hydrants, and for opening valves contained in the hydrants, the docking station resiliently suspended from the cart for substantially free-floating movement relative to the cart and to the hydrants; and a hose operatively connected between the valve actuator and the sprinkler.

In another aspect, the invention relates to an automatic traveling sprinkler comprising a cart including a cart frame; a plurality of wheels attached to the cart frame, including a pair of drive wheels for moving the cart between a plurality of water supply valves projecting upwardly from a water supply pipe; a power supply supported on the cart frame and operatively connected to the pair of drive wheels; a sprinkler mounted on the cart frame; a floating docking station resiliently suspended from the cart frame for movement in plural directions relative to the cart frame, the docking station supporting a valve actuator adapted to engage and open one of the water supply valves when the docking station has aligned the valve-actuating cylinder with the one water supply valve; and a hose extending between the valve-actuating cylinder and the sprinkler.

In another aspect, the invention relates to an automatic sprinkler comprising a wheeled cart having an electromechanical drive thereon for moving the cart along a path defined by a plurality of spaced water supply valves; a docking station mounted on the cart adapted to engage, successively, individual ones of the plurality of water supply valves, wherein the docking station supports a valve actuator having a plunger operable to open the water supply valve; and a pressure accumulator supported on the cart frame and arranged to supply the valve actuator with water under pressure.

In another aspect, the invention relates to automatic traveling sprinkler comprising a cart including a cart frame; a plurality of wheels attached to the cart frame, including a pair of drive wheels for moving the cart between a plurality of water supply valves projecting inwardly from a water supply pipe; a power supply supported on the cart frame and operatively connected to the pair of drive wheels; a sprinkler mounted on the cart frame; and a floating docking station resiliently suspended from the cart frame for limited movement in plural directions relative to the cart frame, the docking station supporting a valve-actuating cylinder adapted to engage and open one of the water supply valves when the docking station has aligned the valve-actuating cylinder with the one water supply valve; wherein the docking station includes a housing and a tapered shroud for guiding the docking station into alignment with the water supply valve; and wherein the docking station is resiliently suspended from the cart.

In still another aspect, the invention relates to an automatic traveling sprinkler comprising a cart; first means on the cart for moving the cart along a path defined by a water supply pipe; second means for engaging and actuating, successively, a plurality of water supply valves arranged along the pipe; a sprinkler mounted on the cart and in fluid communication with the second means; and third means mounted on the cart for controlling operation of the first and second means.

In still another aspect, the invention relates to a method of operating a water supply valve actuator carried on a mobile sprinkler apparatus having at least one sprinkler thereon comprising (a) moving the mobile sprinkler apparatus to a position where the water supply valve actuator is aligned directly over a water supply supported on a water supply pipe; (b) driving a valve actuator component downwardly into the water supply valve to open the water supply valve, using water under pressure stored in at least one pressure accumulator supported on the mobile sprinkler apparatus, thereby permitting water to flow to the sprinkler; (c) after a predetermined time interval, halting flow of water to the sprinkler and recharging the pressure accumulator with water from the water supply pipe; (d) withdrawing the valve actuator component from the water supply valve; and (e) moving the mobile irrigation apparatus to another water supply valve on the water supply pipe.

In still another aspect, the invention relates to a method of operating a water supply valve actuator carried on a mobile sprinkler apparatus having at least one sprinkler thereon comprising (a) moving the mobile sprinkler apparatus to a position where the water supply valve actuator is aligned directly over a water supply supported on a water supply pipe; (b) driving a valve actuator component downwardly into the water supply valve to open the water supply valve, using water in a pressure accumulator obtained from a previously opened water supply valve; and (c) before withdrawing the valve actuator component, recharging the pressure accumulator with water for use in opening the next water supply valve to be opened.

In still another aspect, the invention relates to a hydrant for use on a water supply pipe adapted to supply water to a mobile irrigation apparatus, the hydrant comprising a substantially vertical riser adapted to be secured to the water supply pipe; a valve located in an upper end of the riser, adapted to be opened by a valve actuator on the mobile irrigation apparatus; and wherein a round, external flange plate is located proximate to the upper end of the riser, adapted to be engaged by the mobile irrigation apparatus.

In still another aspect, the invention relates to an automatic traveling sprinkler comprising a cart including a cart frame; a plurality of wheels attached to the cart frame, including a pair of drive wheels for moving the cart between a plurality of water supply valves projecting upwardly from a water supply pipe, and at least one pair of guide wheels adapted for engagement with the water supply pipe, the guide wheels mounted on a freely pivotable steering frame assembly; a power supply supported on the cart frame and operatively connected to the pair of drive wheels; a sprinkler mounted on the cart frame; and a floating docking station resiliently suspended from the cart frame for movement in plural directions relative to the cart frame.

The invention will now be described in detail in connection with the drawings identified below.

DETAILED DESCRIPTION OF THE INVENTION

Figure 1:
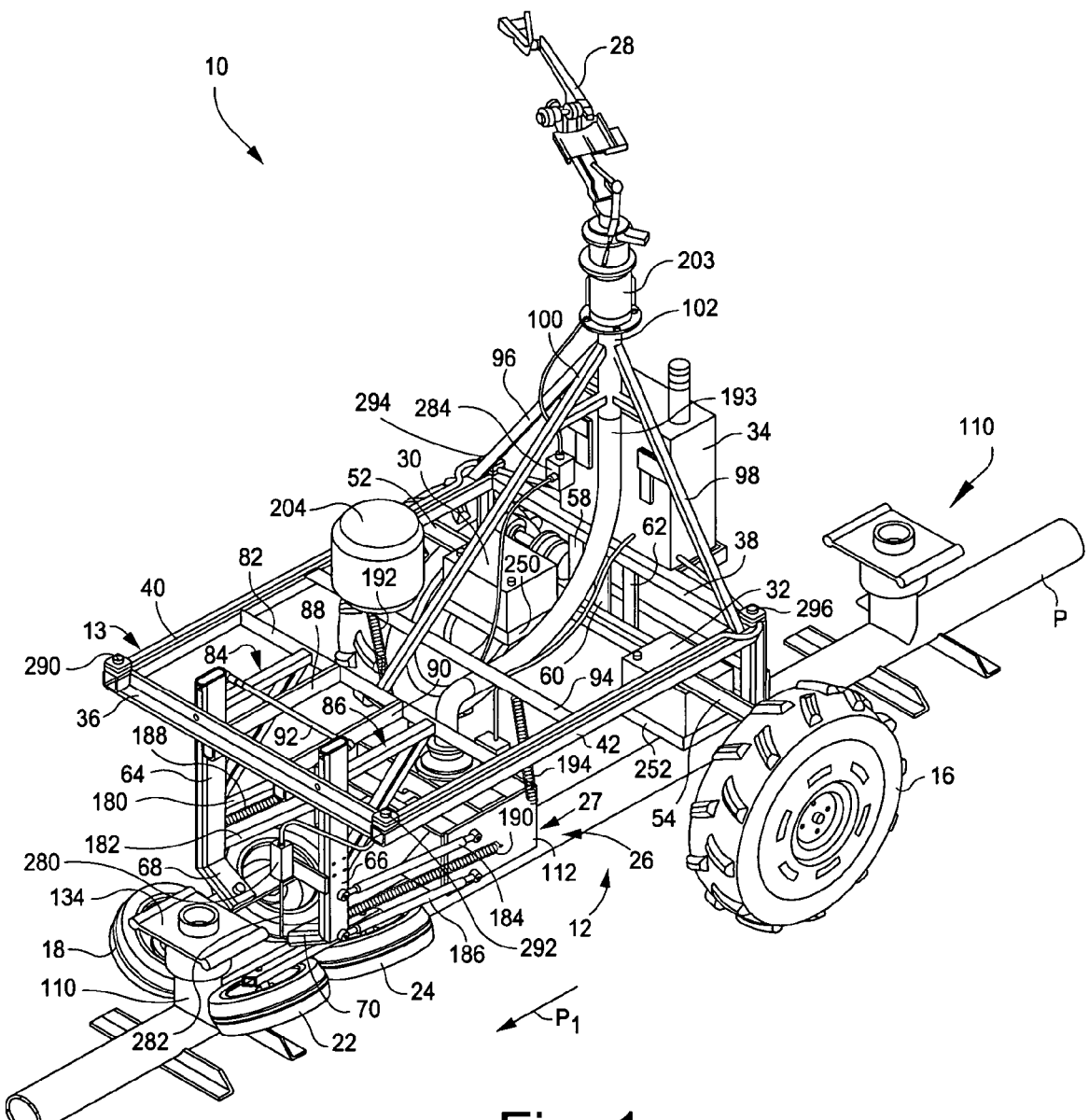
FIG. 1 is a perspective view of a traveling sprinkler in accordance with an exemplary embodiment of the invention.

With reference initially to FIGS. 1-5, the traveling sprinkler 10 generally includes a cart 12; a pair of rear drive wheels 14, 16; two pairs of forward guide wheels 18, 20 and 22, 24; a docking station 26 communicating with a single large-volume sprinkler 28; a pair of 12-volt batteries 30 and 32; and a programmable logic controller (PLC) 34.

More specifically, the cart 12 is formed by a rectangular steel or other suitable metal (e.g., aluminum) frame 13 that includes parallel front and rear rails 36, 38 connected by parallel side rails 40, 42 welded together to form a rigid main frame subassembly (or simply, main frame). Vertical frame members 44, 46 extending downwardly at the rear of the main frame support the drive wheels 14, 16 via conventional stub axles 48, 50. The main frame is reinforced at the rear by angled rails 52, 54 extending between the vertical frame members 44, 46 and the side rails 40, 42. A crossbeam 56 extends between the vertical frame members 44, 46 approximately midway along the vertical frame members 44, 46 and in vertical alignment with the rear rail 38. Vertical struts 58, 60 and 62 extend between rear rail 38 and crossbeam 56 to provide additional support.

Vertical frame members 64, 66 extend downwardly from the front rail 36 (spaced inwardly from the ends of the rail) and support the two pair of forward guide wheels 18, 20 and 22, 24. More specifically, short frame components 68, 70 are welded to the members 64, 66 at about opposite 30° angles to horizontal, respectively, and support axially oriented wheel support rods 72, 74. Wheels 18 and 20 are supported via stub axles 76, 78 at opposite ends of the support rod 72, while wheels 22, 24 are supported via stub axles 80, 81 at opposite ends of the support rod 74. Thus, the wheels 18, 20 and 22, 24 are also oriented, respectively, at about a 30° angle to horizontal. By so orienting the guide wheels, they are able to engage the main water supply pipe P from opposite sides thereof, thus enabling the cart 10 to follow the pipe.

The front end of the main frame is also reinforced. A crossbeam 82 extends between the side rails 40, 42 slightly to the rear of the guide wheels 20, 24. Angled brace assemblies 84, 86 extend between the crossbeam 82 and respective vertical frame members 64, 66. Additional support is provided by parallel members 88, 90 that extend between the front rail 36 and crossbeam 82, inside the brace assemblies 84, 86. A cross link 92 also extends between the vertical frame members 64, 66 at the upper ends of the frame members. One additional crossbeam 94 extends between the side rails 40, 42 midway between the front and rear of the main frame.

The sprinkler 28 is supported on a tripod frame including members 96, 98 welded at the rear of side rails 40, 42 and member 100 welded to the crossbeam 82. Members 96, 98 and 100 converge at, and are welded to a cylindrical pipe section 102 on which the sprinkler 28 is supported, as described further below. The tripod frame is reinforced by short braces 104, 106 and 108.

In connection with the further description of the docking station and related hardware, the various drawing figures have been simplified via omission of details for the sake of clarity and ease of understanding. For example, in some views, certain structure not necessary for understanding the text relating to these views has been omitted. In addition, wiring and other minor details that would otherwise clutter the drawings, but that are nevertheless well understood by those of ordinary skill in the art, have also been omitted from various figures.

The docking station or housing 26 is suspended from the cart 12, generally in the middle of the main frame 13, but below the main frame so as to facilitate alignment of the docking station 26 with a hydrant 110 on the pipe P. With further reference to FIGS. 6-11 (simplified for ease of understanding), the docking station 26 includes a housing 27 with outer parallel side plates 112, 114, a back plate 116, and an intermediate plate 118 that extends between the side plates 112, 114 and is parallel to the back plate 116. Note that in FIGS. 6-11, the docking station is facing in the opposite direction from that shown in FIGS. 1-3. For convenience and ease of understanding, arrows in FIGS. 1 and 6-8 show the direction of movement of the cart and hence, the docking station, along a path $P_1$. Note also that in FIGS. 6, 7 and 8, the side plate 114 has been removed to permit sight of the components inside the docking station housing 27.

Within the housing 27, there is a tapered shroud 120 secured to the side plates 112, 114 and intermediate plate 118 by any suitable means (welding, bolts, etc.). The shroud 120 includes a top wall 122, a bottom wall 124 and a pair of side walls 126, 128, all of which taper in a rearward direction to a horizontally oriented slot 130 that resembles a similarly shaped slot 132 in the back plate 116. The plate 118 is also cut out to include a similar slot (not visible). The slots 130, 132 are substantially T-shaped, and bottom wall 124 of the shroud 120 is split, leaving a wide opening in the center thereof to permit passage of the cart 10 and docking station 26 over and beyond each hydrant 110 on the pipe P as the cart travels along the pipe (see FIG. 10). The slot 130 at the rear of the shroud is configured to receive the hydrant 110 and a substantially flat, rectangular docking plate or flange 134 fixed (by welding, for example) on the top of a vertical riser 111 of the hydrant 110. The T-shaped slots 132 in plate 116 and similar slot in plate 118 are also sized and shaped to receive the generally similar T-shaped cross-sectional shape of the combined riser and docking plate 134 as also best seen in FIG. 10.

The intermediate plate 118 not only reinforces the housing 27 but also provides support, along with plate 116, for the hydrant valve actuator 136. A docking stop assembly 138 and dock stop limit switch 140 are also supported on the plate 116. More specifically, the dock stop limit switch 140 is secured to the exterior surface of the plate 116, adjacent the stem portion of the T-shaped slot 132 in the plate. A switch arm 142 is pivotally mounted in the switch box and a roller 144 is secured to the remote end of the arm. Roller 144 projects upwardly into the slot 132 and is located so as to be engaged by a forward edge 148 of the docking plate 134 (see FIG. 7) as the docking station housing 27 moves over the riser 111 of the hydrant 110.

Figure 6:
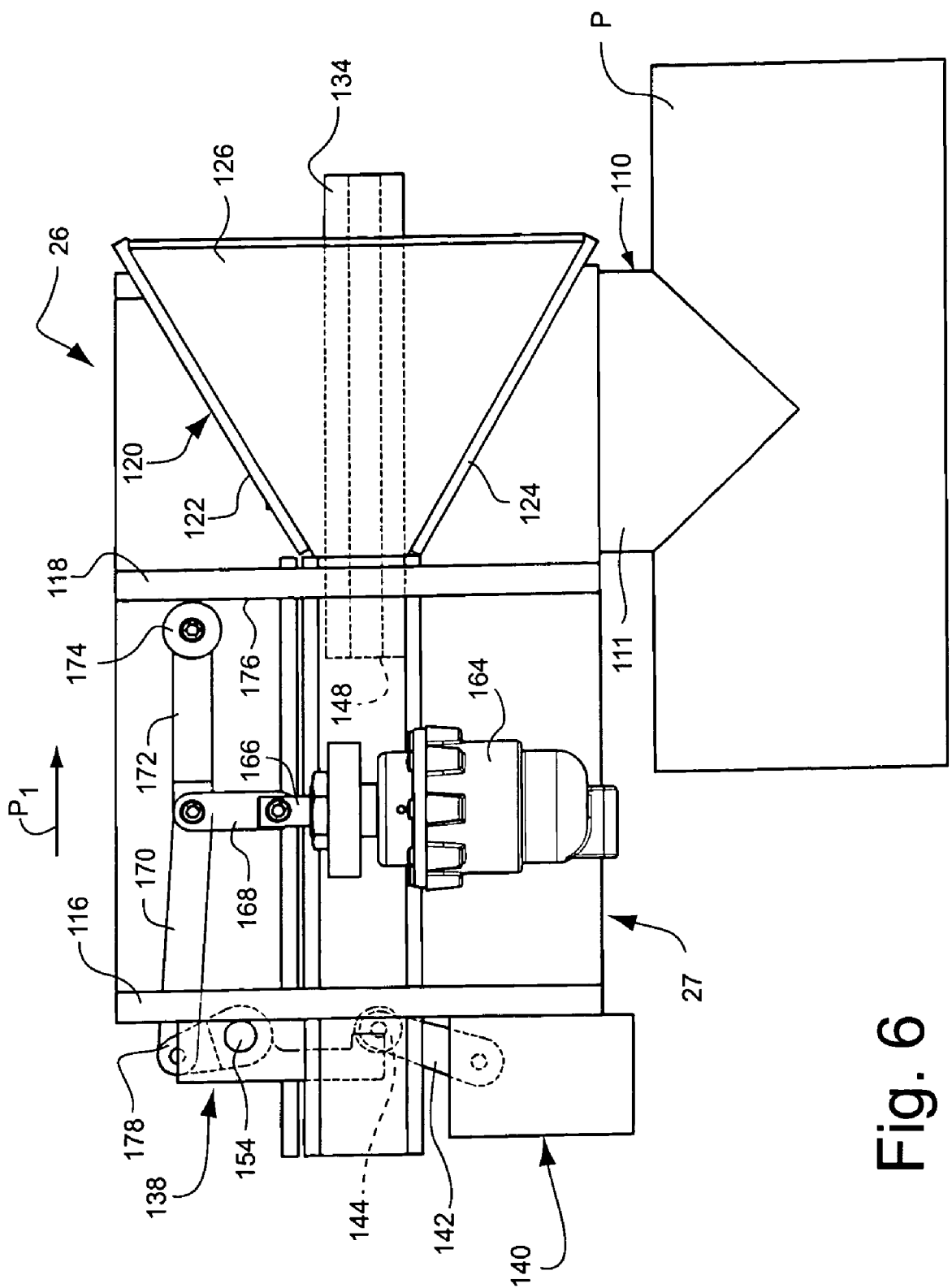
FIG. 6 is a side elevation of a docking station component incorporated in the traveling sprinkler shown in FIGS. 1-5, shown in a position where the docking station is approaching the water supply valve.
Figure 7:
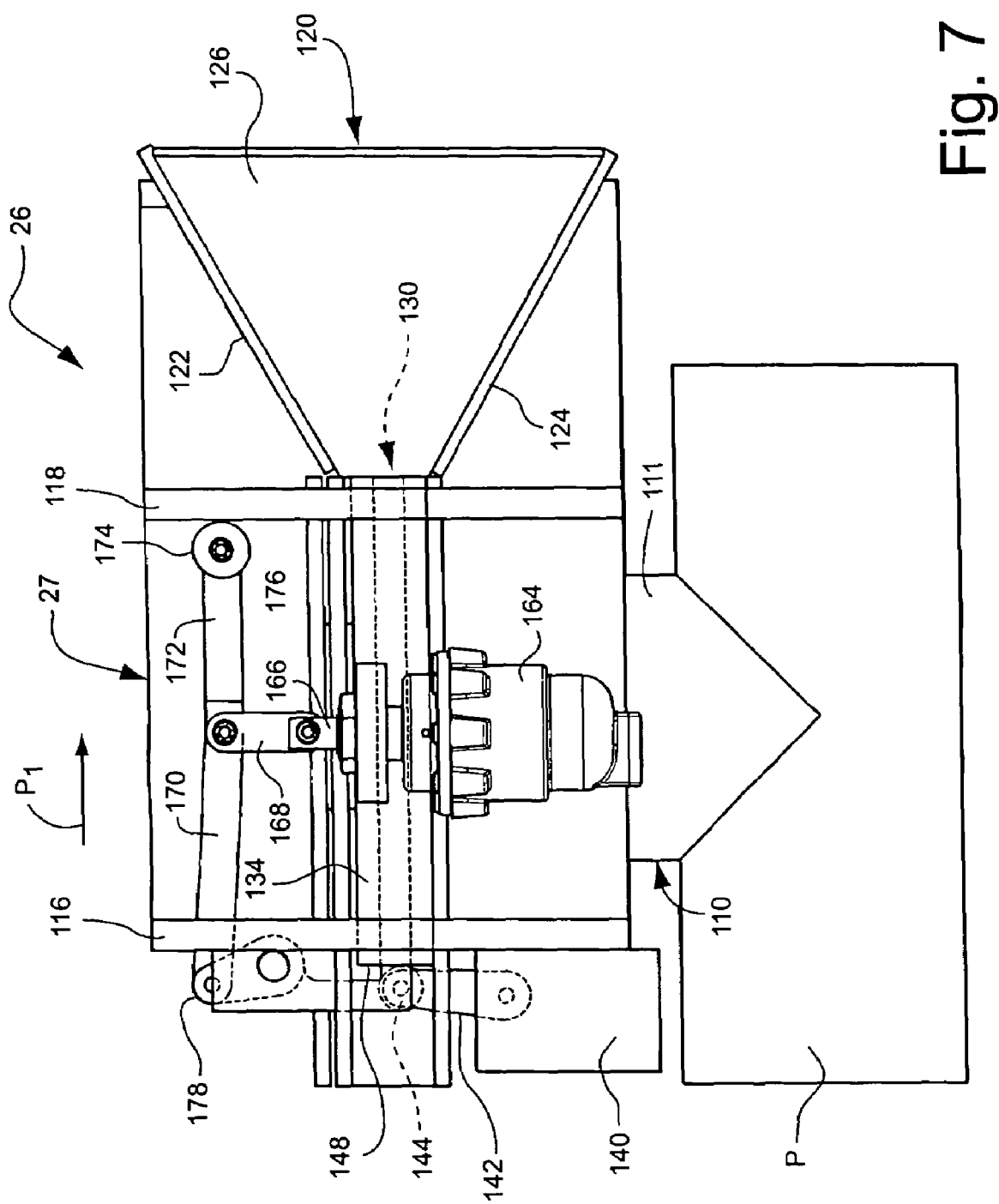
FIG. 7 is a side elevation similar to FIG. 6 but where the docking station has fully engaged the water supply valve.
Figure 8:
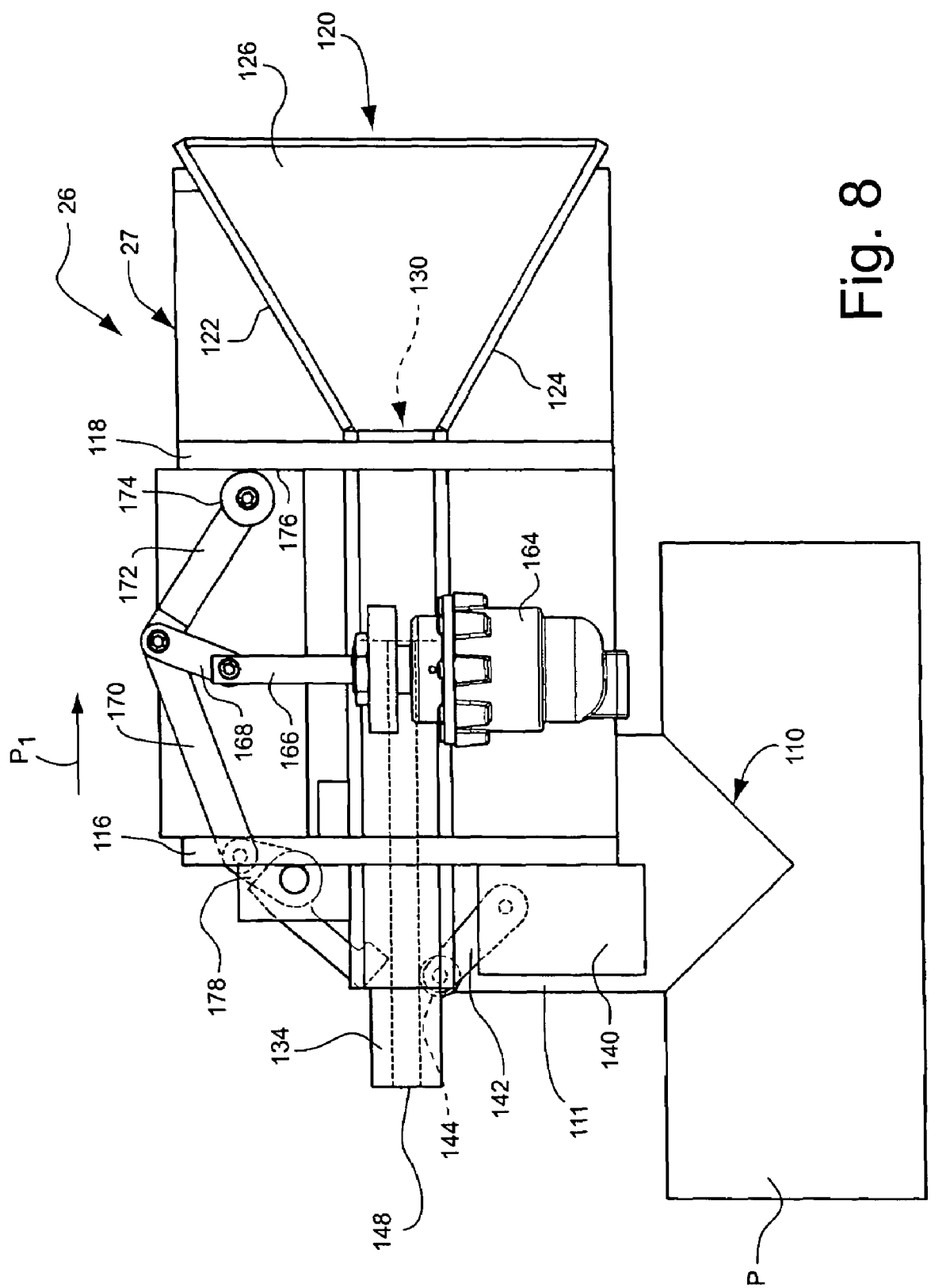
FIG. 8 is a side elevation similar to FIGS. 6 and 7, but showing the docking station partially released from the water supply valve.
Figure 9:
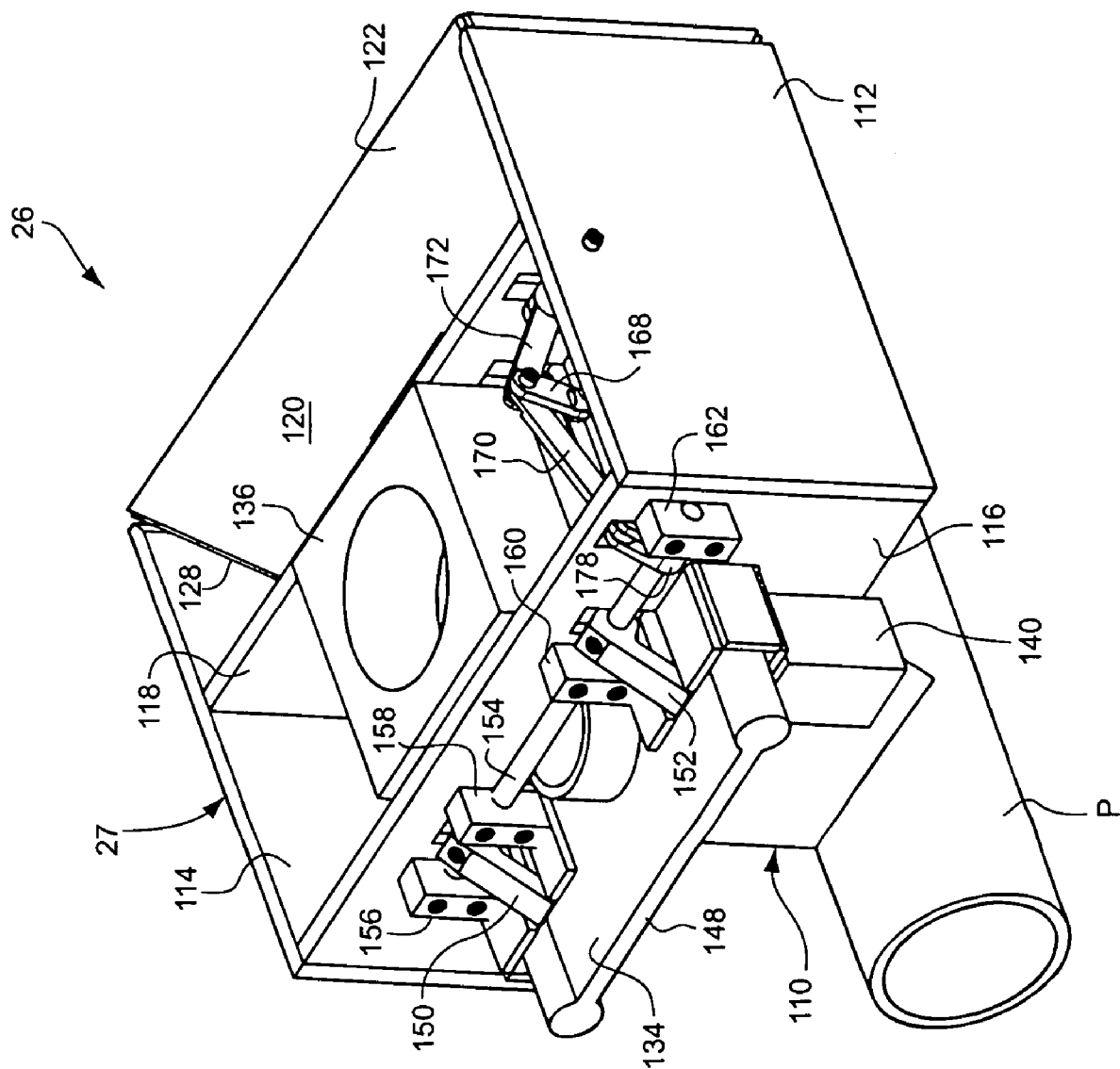
FIG. 9 is a perspective view of the docking station in the position shown in FIG. 8.
Figure 10:
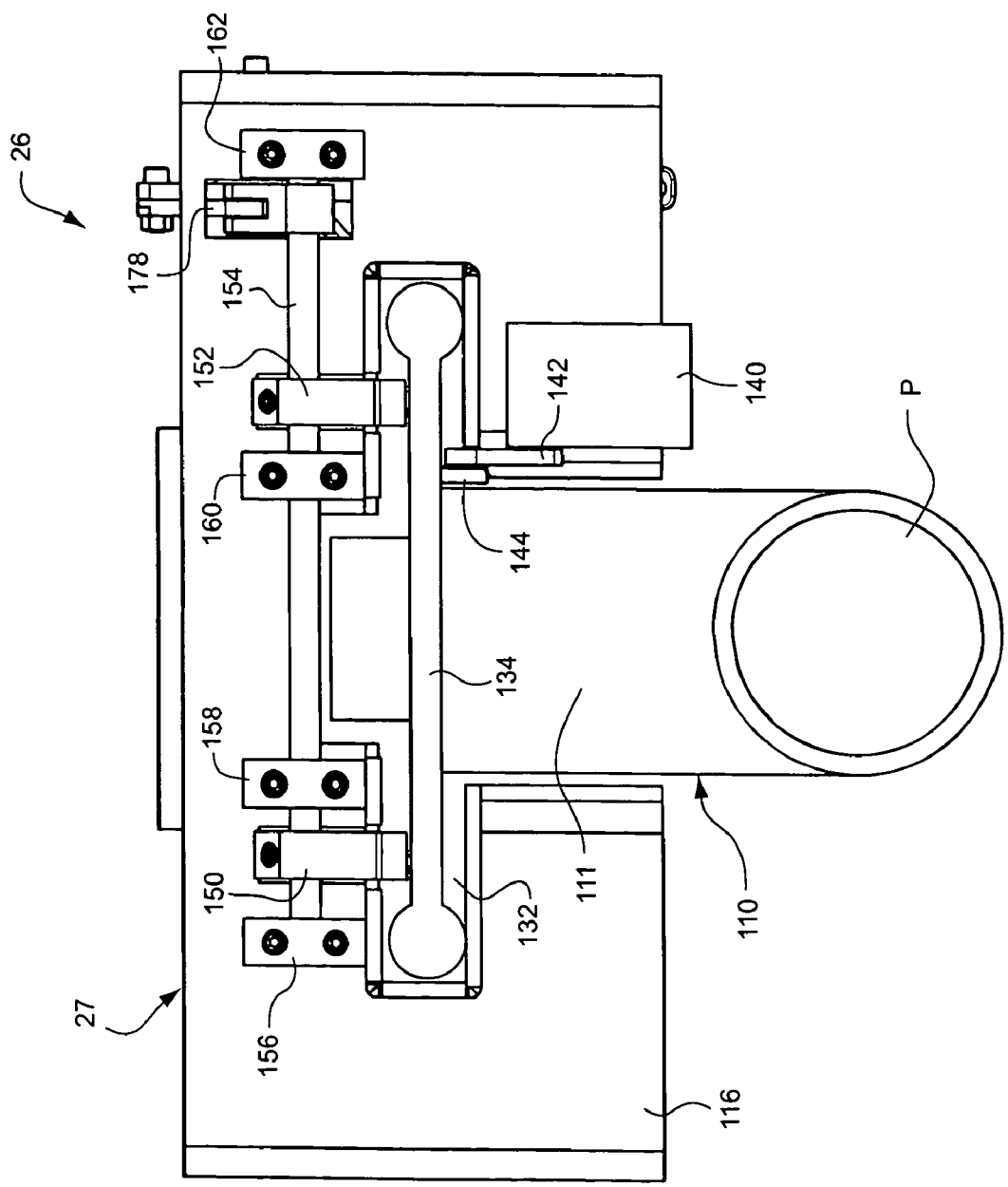
FIG. 10 is a rear elevation of the docking station shown in FIGS. 8 and 9.
Figure 11:
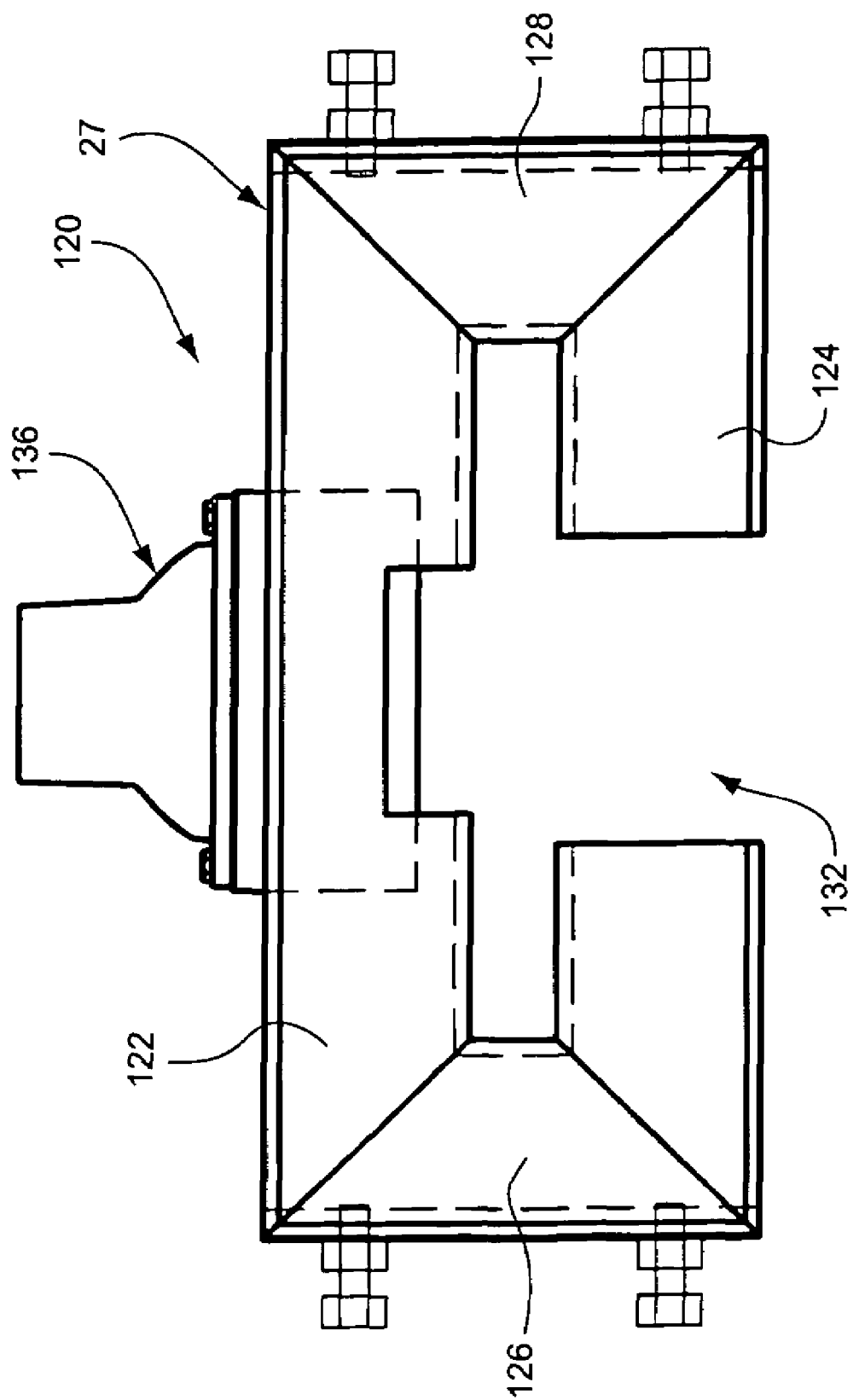
FIG. 11 is a simplified front elevation of the entry shroud on the front of the docking station shown in FIGS. 6-10.

The docking stop assembly 138 includes a pair of docking stops 150, 152 mounted on a transverse shaft 154 for rotation with the shaft. The shaft 154 is journalled for rotation in bearing cages 156, 158, 160 and 162 fixedly mounted on the exterior surface of the plate 116. The docking stops 150, 152 are movable between an extended "stop" position as shown in FIGS. 6 and 7, and a retracted "go" position as shown in FIGS. 8-10. Rotation of the shaft 154 and hence docking stops 150, 152 is controlled by a hydraulic actuator 164 mounted on the interior side of the plate 112. An actuator rod 166 extending out of the actuator 164 is connected to one end of a first link arm 168 that is, in turn, connected at its other end to a pair of links 170, 172. Link 172 is pivotally secured to a pin housed in a roller 174 attached to intermediate plate 118, while link 170 extends in a substantially opposite direction with its free end pivotally secured to a drive link 178 that is, in turn, fixed to the drive shaft 154.

The operation of the docking stops 150, 152 and dock stop limit switch 140 will be described further hereinbelow.

Returning to FIGS. 1-5, the docking station 26 is suspended, i.e., hung, from the frame 12 by several suspension components including two pairs of tie rods 180, 182 on one side of the housing 27, and 184, 186 on the other side of the housing 27. Tie rods 184, 186 extend between the vertical frame member 66 and the side plate 112 of the housing 27. Tie rods 180, 182 extend between the other vertical frame member 64 and the side plate 114 of the housing 27. The docking station 26 is further supported by a first pair of elongated, generally horizontally-oriented coil springs 188, 190 extending between side plates 112, 114 and vertical frame members 66, 64, respectively. Springs 188, 190 are located between each pair of tie rods 180, 182 and 184, 186, respectively. A second pair of vertically-oriented elongated coil springs 192, 194 extend between the cross brace 94 and the side plates 112, 114 of the docking station housing 27.

Figure 2:
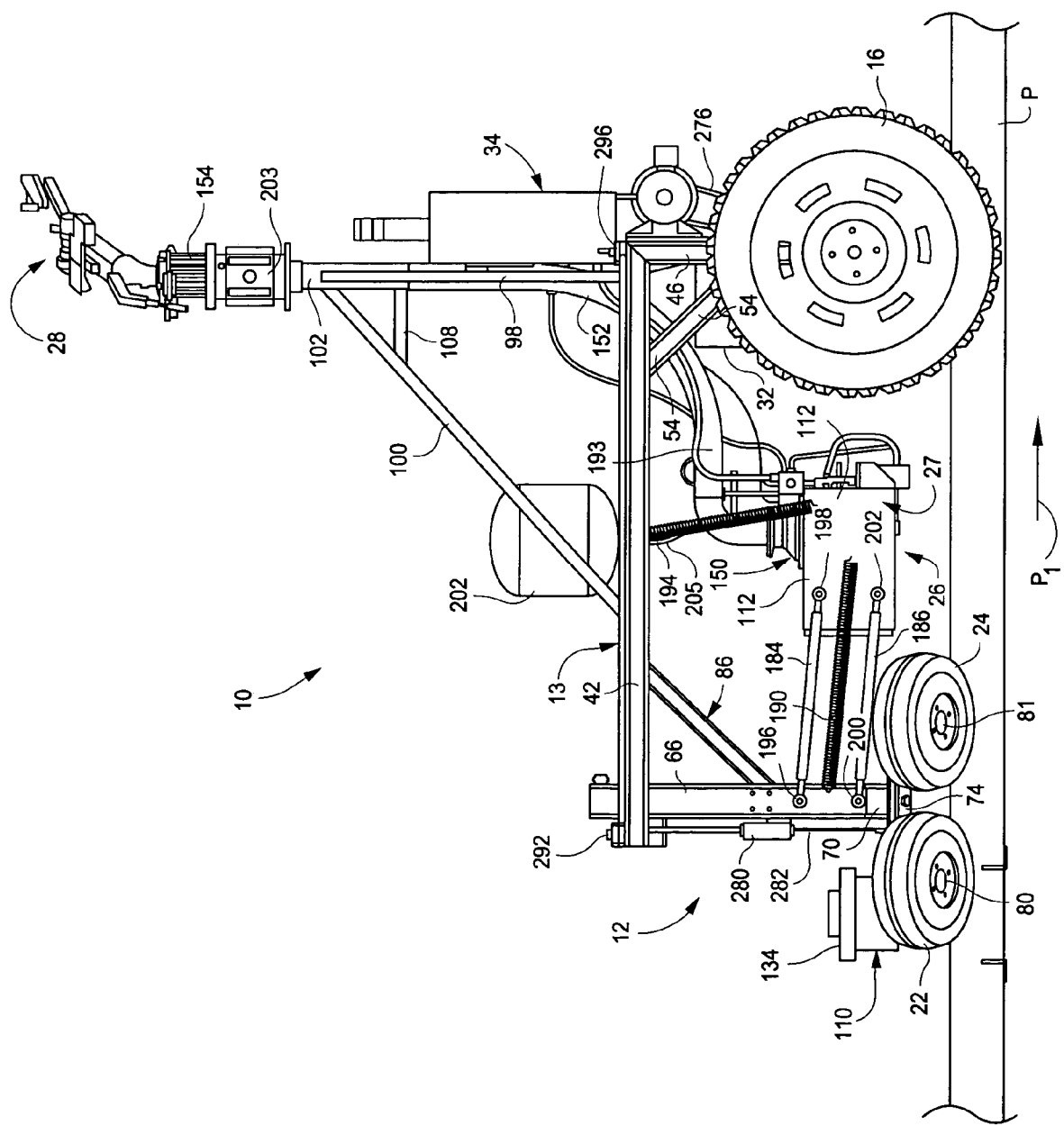
FIG. 2 is a side elevation of the traveling sprinkler shown in FIG. 1.
Figure 3:
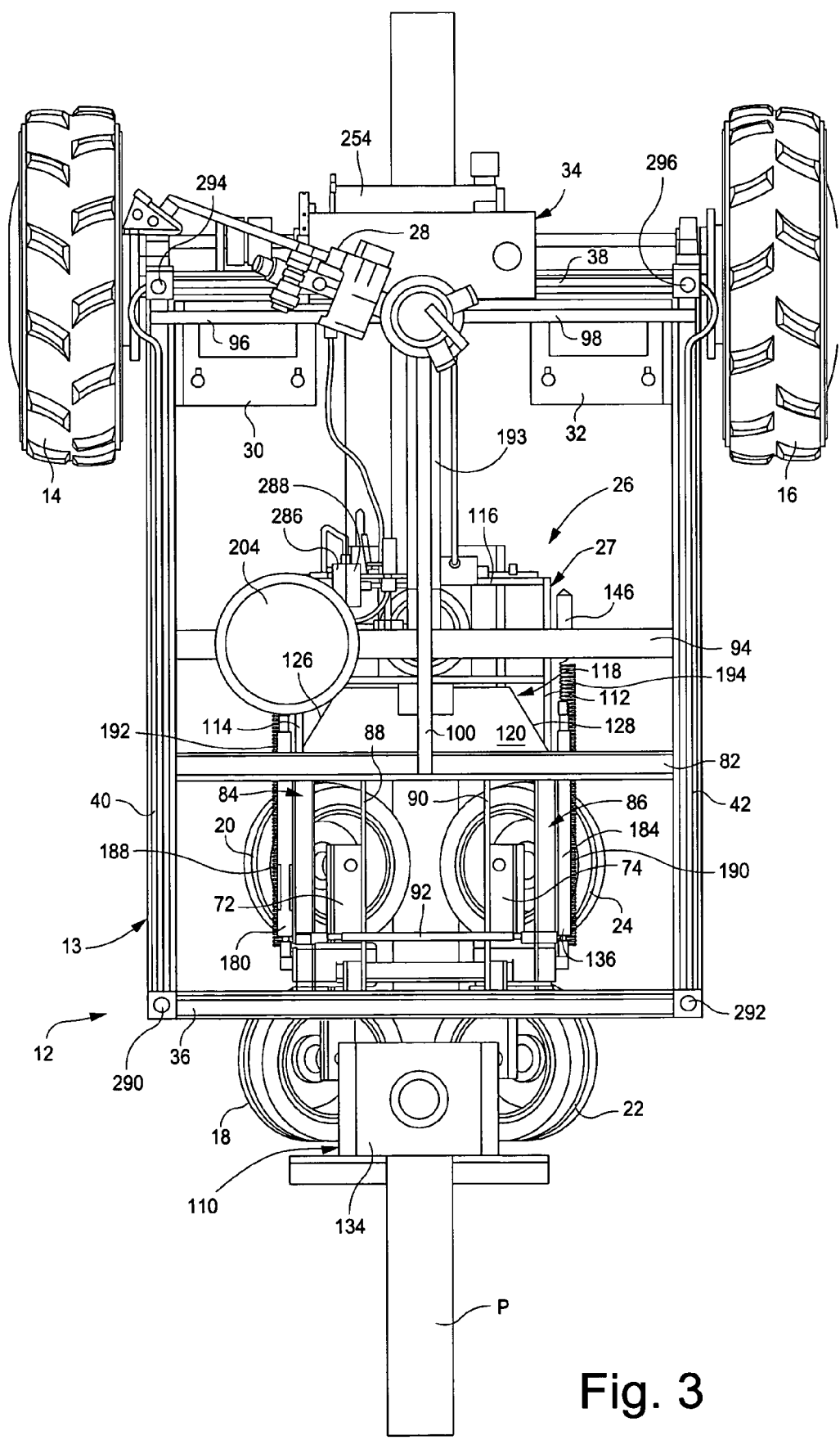
FIG. 3 is a top plan view of the traveling sprinkler shown in FIG. 1.
Figure 4:
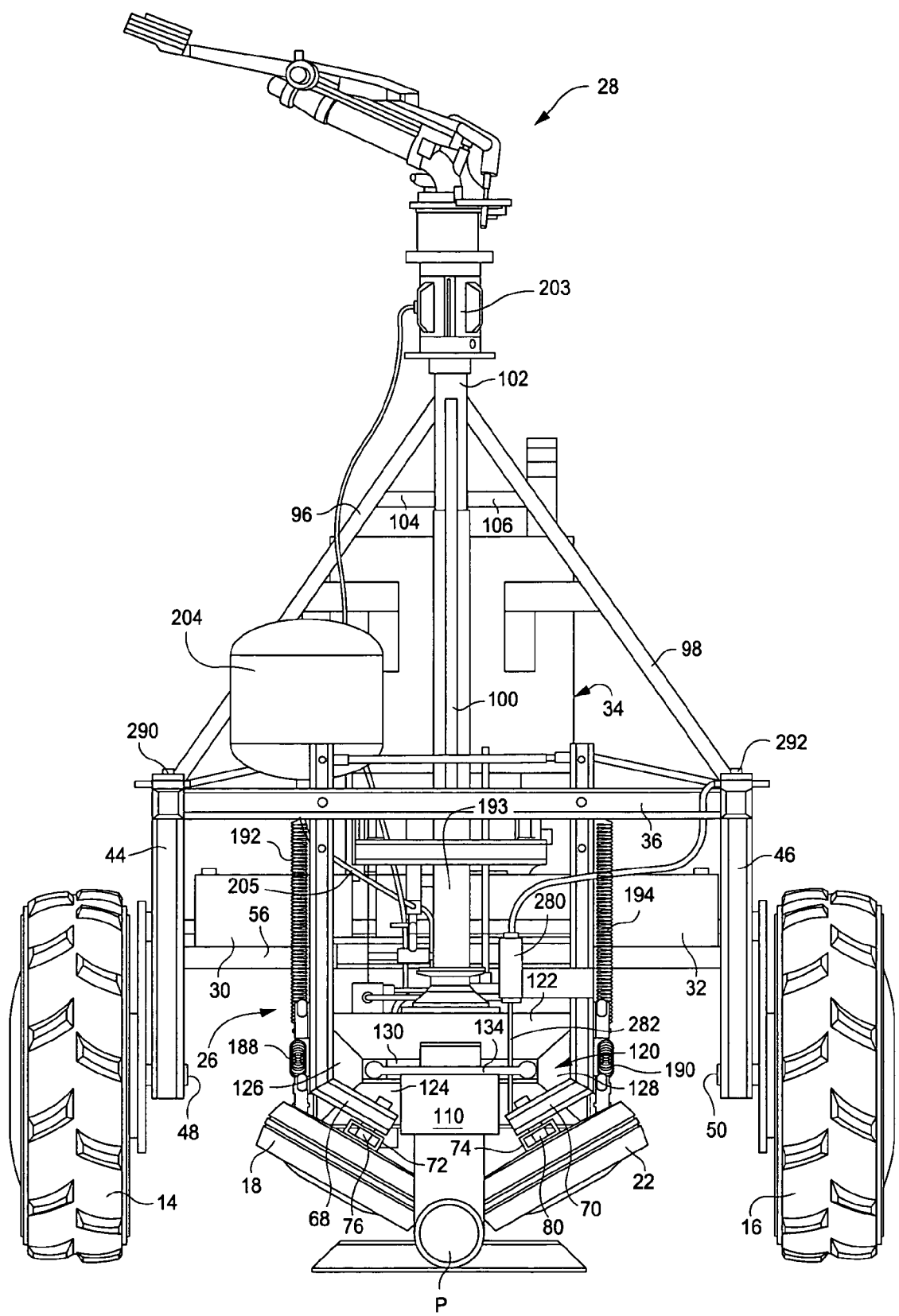
FIG. 4 is a front elevation of the traveling sprinkler shown in FIG. 1.
Figure 5:
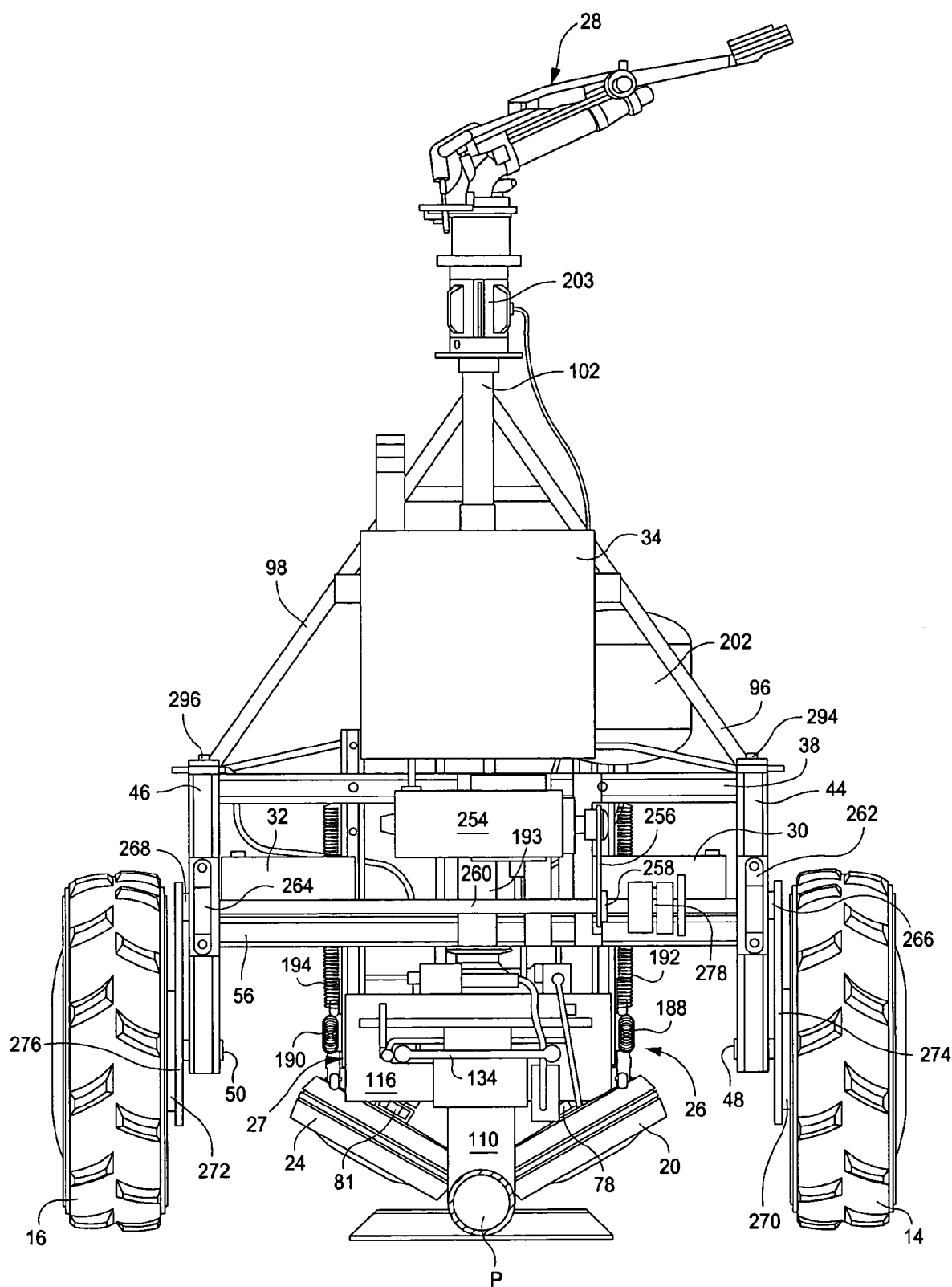
FIG. 5 is a rear elevation of the traveling sprinkler shown in FIG. 1.

With this arrangement, the docking station 26 "floats" relative to the cart frame 12 for movement in at least three mutually perpendicular directions, i.e., vertical, horizontal front-to-back (and vice versa), and horizontal side-to-side. In addition, limited compound movements, i.e., tilting, twisting or swiveling and combinations thereof, are also possible by reason of the flexible nature of the vertically-oriented springs in combination with the tie-rod universal mounts or bushings 196, 198, 200 and 202 (FIG. 2). These multiple degrees of freedom of movement permit reliable and accurate docking with hydrants 110 even when the latter are out of alignment relative to the docking station.

As best seen in FIG. 9, the valve actuator 136 is supported between plates 116 and 118 in the docking station housing 27. The valve-actuating cylinder 136 is connected to the lower end of the pipe section 102 by a flexible hose 193 (FIGS. 1-5) which feeds water from the hydrant 110 to the sprinkler 28. Sprinkler 28 may be any conventional large-volume sprinkler, such as the Big Gun™ Series 75 or Series 100 available from the assignee, Nelson Irrigation Corporation. As such, the sprinkler 28 need not be described in detail, except to note that the sprinkler is rotatable about a vertical axis through various adjustable arcs, under the control of the PLC 34. Other suitable sprinklers may be utilized however. A pressure control valve 203 is located at the base of the sprinkler 28 and controls the flow of water to the sprinkler. The control valve 203 may be of any suitable type, for example, the "800 Series Control Valve," also available from Nelson Irrigation Corporation.

A pressure accumulator 204 is supported on the cross-beam 94 (by any suitable means) and is in fluid connection via hose 205 (FIGS. 2, 12 and 13) with the valve actuator 136 as further described below. The pressure accumulator 204 may be of any suitable type, for example, a TEEL® precharged water well tank, Model No. 3P676C.

Figure 12:
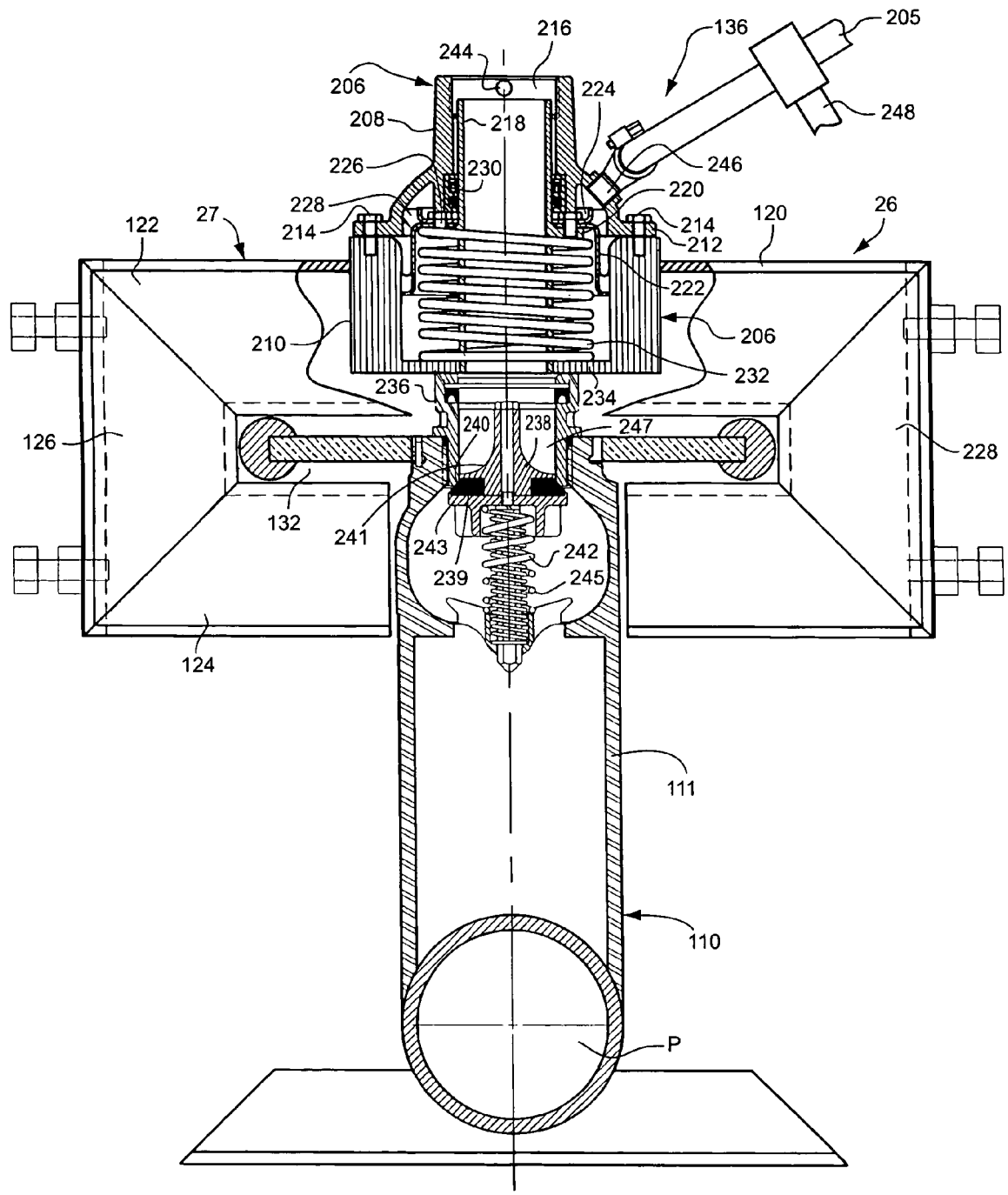
FIG. 12 is a front elevation of the docking station engaged with the water supply valve, and illustrating the valve-actuating cylinder carried by the docking station, with the water supply valve in the closed position.
Figure 13:
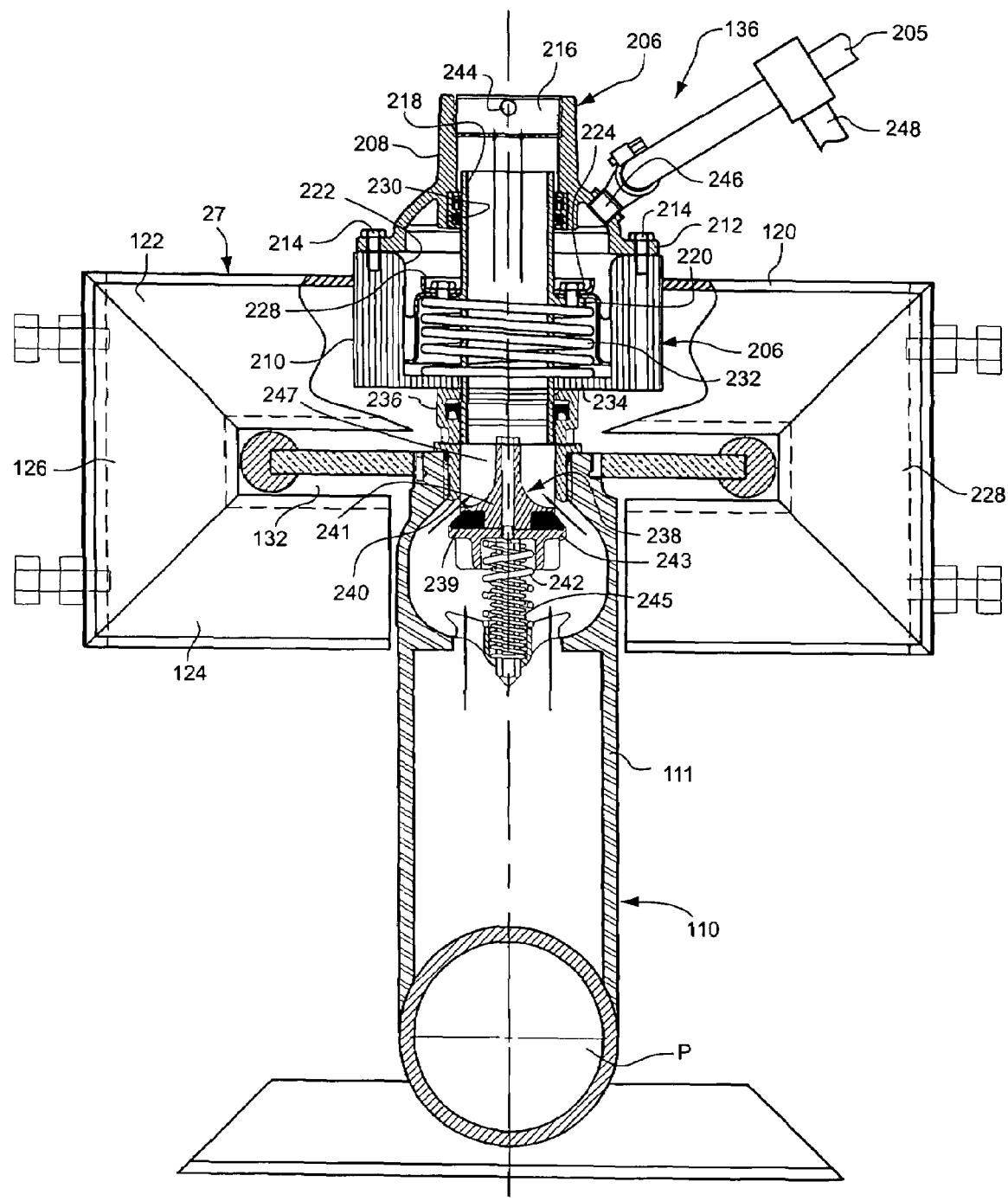
FIG. 13 is a section view similar to FIG. 12 but showing the water supply valve in an open position.

Turning to FIGS. 12 and 13, the valve actuator 136 includes a cylindrical actuator housing 206 having a reduced diameter upper housing portion 208 and a lower housing portion 210, secured together about flange 212 by a plurality of bolts 214 or the like. The upper housing portion defines a chamber 216 having an internal diameter sized to receive a key cylinder or plunger 218 that has a radial flange 220 approximately midway along the length of the plunger, on which is seated an inner periphery of a rolling diaphragm 222. The inner edge of the diaphragm is thus clamped between the flange 220 and an annular ring 224, secured by screws 226. The outer periphery of the diaphragm is clamped between the upper and lower housing portions 208, 210, thus establishing a sealed chamber 228 above the diaphragm. In this regard, the plunger 218 is sealed relative to chamber 216 via annular seal 230. The plunger 218 is biased in an upward direction, to the position shown in FIG. 12 by means of a coil spring 232 acting between the bottom wall 234 of the lower housing portion 210 and the radial flange 220. The lower end of the plunger 218 is adapted to move downwardly upon pressurization of chamber 228, with the flange 220 and ring 224 serving as a piston, through the housing and valve seal guide 236 into engagement with a water supply valve assembly 238 in the riser 111. The valve seal guide is sized to receive the plunger 218 in a close-fit arrangement that precludes water escaping along the joined surfaces of the valve-actuating cylinder and the valve seal guide. Movement of the plunger through the valve seal guide 236 will unseat the water supply valve assembly 238, including the tapered, annular seal ring 239 from its seat 240 (FIG. 13), against the bias of a pair of springs 242, 245 to thereby open the valve as described further below. Seal ring 239 may be made of any suitable material, for example, a flexible Buna-Nitrile or similar material. The seal ring is sandwiched between a pair of support surfaces 241, 243 which form part of the valve seal assembly 238. Springs 242 and 245 are telescoped, one within the other, to provide the desired bias. Note also that water supply valve 238 includes a plurality of radially directed spokes or webs 247 that allow water to pass through the valve but also provide surfaces for engagement by the plunger 218 as it moves downwardly into the seal guide 236.

A port 244 is provided at the upper edge of the upper housing portion 208 for a pressure sensor 251 (FIG. 14), and another port (not shown) is provided on the opposite side of the housing portion 208 for a key cylinder or plunger proximity switch 249 (FIG. 14), and a port fitting 246 is connected to the upper housing portion 208, and specifically chamber 228, establishing fluid communication with the pressure accumulator 204 (FIG. 3) via hose 205. A vent valve 248 permits porting of the water in chamber 228 to atmosphere as described further below.

Returning to FIG. 5, the drive wheels 14, 16 are powered by the pair of 12-volt batteries 30, 32 that are supported in trays 250, 252 (FIG. 1) fixed to the crossbeam 56. The batteries 30, 32 are connected to, for example, a conventional 0.5 HP axial drive motor and gearbox assembly 254 supported on the rear rail 38. The gearbox is connected via chain 256 to a sprocket 258 on a drive shaft 260 that is journalled in bearings 262, 264 fixed to the vertical frame members 44, 46. The wheels 14, 16 are connected to the drive shaft via sprockets 266, 268 on the ends of the drive shaft 260 and sprockets 270, 272 on the stub axles via chains 274, 276, respectively. A conventional differential 278 interposed along the drive shaft permits the wheels 14, 16 to rotate at different speeds, thus enabling the cart to move through curves as determined by the layout of the pipe P.

Note that there are no separate hydraulic drive systems in the illustrated embodiments. All movements and functions are carried out electrically in concert with applied water pressure derived from the water supply pipe. However, hydraulic drives, electromechanical drives, and the like may also be used.

The PLC 34 is programmed to control not only the cart movement, but also the operation of the docking station, valve-actuating cylinder and the sprinkler itself.

Figure 14:
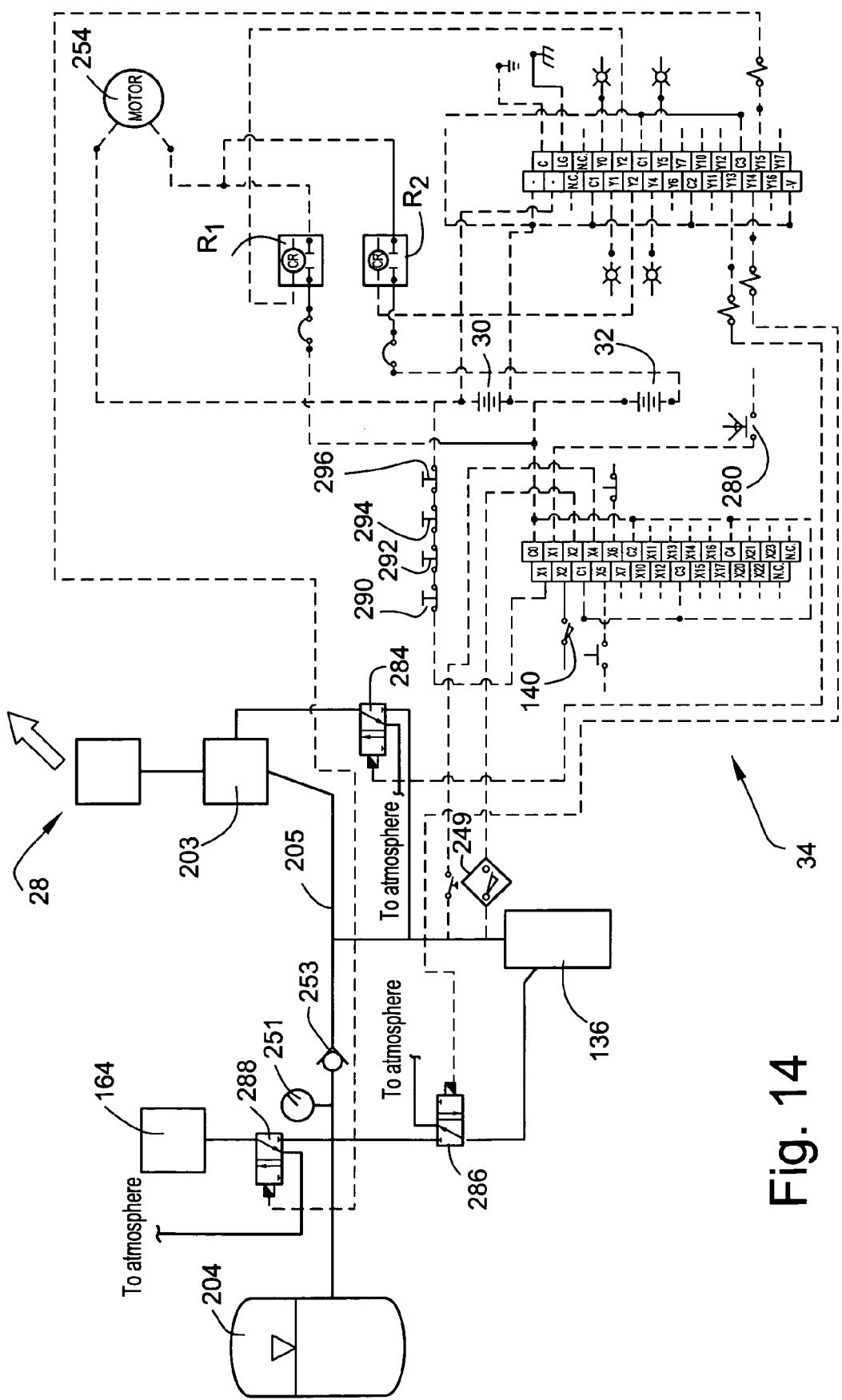
FIG. 14 is a schematic system diagram for the embodiment shown in FIGS. 1-13.

In use, and with reference not only to FIGS. 1-13 but also to the system diagram in FIG. 14, a first necessary step is to be sure that safety buttons 290, 292, 294 and 296 (FIGS. 1-5, 14) located at the four corners of the cart frame are pulled outwardly. This is a safety measure, in that the motor 254 cannot be started until these buttons are in the proper extended positions. Conversely, during operation, if any one of these buttons is depressed, the motor will switch off and the cart will stop. Once started, the traveling sprinkler 10 and specifically the cart 12 drives along irrigation pipe P, following path $P_1$, using the four forward guide wheels 18, 20, 22, 24 to follow the pipe. As the cart approaches a water supply hydrant 110, the speed control limit switch 280 and its vertically oriented sensor wand 282 (FIGS. 1 and 2) is tripped which signals the PLC 34 to reduce the voltage to the drive motor 254 (FIGS. 5 and 14) from 24 volts to 12 volts by removing power from one of the two control relays $R_1$ and $R_2$ (FIG. 14). The voltage reduction results in a speed reduction of the cart. The PLC 34 also sends power to a control valve solenoid 284 (FIGS. 1 and 14) which ports water to the outer sleeve of the valve and thus closes the control valve 203.

As the cart 12 drives forward, approaching the riser 111 and dock plate 134, the docking stops 150, 152 are down or extended in the "stop" position, ready to stop the cart when engaged by the plate or flange 134 (FIGS. 6 and 7). At this stage, the docking limit switch 140 is also in an untripped state.

As the cart continues its forward travel, the docking plate or flange 134 is captured by the docking station shroud 120 which guides the docking plate 134 toward the docking stops 150, 152 and the dock stop limit switch 140. The docking plate 134 engages the roller 144 and trips the dock stop limit switch 140 after passing through the docking station shroud 120, and the limit switch signals the PLC 34 to stop the forward movement of the cart 12 by removing power from the other of the two control relays. The cart 12 then coasts forward until the docking stops 150, 152 are engaged by the docking plate 134, bringing the cart 12 to a stop (see FIG. 7).

After a time delay, the PLC 34 sends a signal to the main water on/off control solenoid 286 (FIGS. 3 and 14) which ports water under pressure from the pressure accumulator 204 to the valve actuator 136 in the docking station housing 27. As a result, the plunger 218 moves downwardly past the valve seal guide 236 nested in the riser 111 and opens the valve assembly 238 (see FIGS. 12 and 13), pushing the valve ring off the valve seat 240 (FIG. 13). After a valve proximity switch 249 (FIG. 14) senses the valve to be open, and a pressure sensor 251 (FIG. 14) senses adequate pressure, the PLC 34 begins the pressure accumulator recharging time delay. This time delay allows sufficient time for system water pressure to recharge the pressure accumulator 204 through a check valve 253 (FIG. 14) in the hose 205. This ensures that the pressure accumulator 204 will be fully charged for engagement with the next water supply valve. After the time delay, the PLC removes power from the sprinkler control valve solenoid 284 which ports water from the outer sleeve of valve 203 to atmosphere, allowing the control valve 203 to open. Water now flows freely from the hydrant 110 to the sprinkler 28 for irrigation.

The sprinkler 28 runs for a programmed amount of time. Once that time has expired, the PLC 34 will remove power from the main water on/off control solenoid 286 (FIGS. 3 and 14) to vent water to atmosphere from the valve actuator 136 via vent 248 (FIGS. 12 and 13). This removes the downward force on the "piston" 220, 224 and diaphragm 222, so that springs 242, 245 in the riser valve assembly 238 and spring 232 in valve actuator 136 force the valve actuator plunger 218 back up into the valve actuator 136 to the position shown in FIG. 12, closing the valve and thus shutting off the flow of water through the valve. The PLC 34 also sends a signal to the docking stop control solenoid 288, causing water to be ported to the hydraulic actuator 164, to extend the actuator rod 166, thereby moving the three linkages 168, 170 and 172. The movement of these linkages rotates the drive link 178 clockwise and, since the drive link is attached to the docking stops 150, 152 via the drive shaft 154, the stops 150, 152 are raised out of the path of the docking plate, to the "go" position shown in FIG. 8.

Once the pressure sensor 251 and valve actuator proximity switch 249 sense no pressure and full plunger retraction, the sprinkler cart 12 is free to continue to the next riser. The PLC 34 energizes one of the power relays $R_1$ and $R_2$ so that the motor 254 will move the cart at slow speed, using only 12 volts, for a programmed amount of time and then, after the cart has cleared the riser and docking plate, the PLC will energize the second of the two power relays $R_1$ and $R_2$ so that the motor 254 is connected to 24 volts. The cart 12 is now back to full speed. As the docking plate 134 continues to pass over the docking station limit switch roller 144 (FIGS. 8 and 9), the limit switch arm 142 is pushed out of the way.

When the docking plate 134 has cleared the docking station limit switch 140, the switch arm 142 is returned to the untripped position via an internal torsion spring. Following a programmed time delay to ensure that the docking plate 134 has cleared the docking station limit switch 140, the PLC 34 removes power from the dock stop control solenoid 288 (FIG. 3) to vent water from the hydraulic actuator 164 to atmosphere. As a result, the hydraulic actuator rod 166 is forced to retract by an internal spring, moving the three link mechanism (168, 170, 172) so as to rotate the drive link 178, drive shaft 154 and docking stops 150, 152 in a counterclockwise direction. The docking stops 150, 152 are now back in position to engage the next hydrant along the supply pipe, as shown in FIG. 6.

It will be appreciated that the invention as described may be modified in several ways. For example, the cart guide wheels 18, 20, 22 and 24 could be made to rotate about horizontal axes and to run on the ground if the pipe P is located below ground. In that case, the cart 12 could also incorporate magnetic, electrical or other means enabling the cart to follow buried pipe to the risers. The docking operation would otherwise remain substantially as described. A wire guide or GPS system could also be employed to guide the cart 12 to the various risers in any desired sequence. In addition, sprinkler 28 may be modified for control by the PLC 34 in terms of throw radius, arc of coverage, etc. It will be appreciated that the PLC 34 may be programmed to vary the sprinkling time at each riser and/or to skip certain risers. In addition, the sprinkler itself may be replaced by a relatively small, transverse boom or truss assembly, also supported on the cart, and to which several smaller sprinklers are attached.

In accordance with a second exemplary embodiment, and with reference to FIGS. 15-30, the docking station 300 is carried by its own supporting frame 302 that, in turn, may be adapted to be rigidly secured to the cart frame 13. The supporting frame 302 includes a pair of inverted U-shaped subassemblies 304, 306 that are connected at their upper ends by frame members (not shown) located below rails 488, 490. The U-shaped subassemblies could be fixed between, for example, crossbeam 82 and another crossbeam (not shown) that would be located rearward of crossbeam 94, at a location that accommodates the length of the U-shaped subassemblies. For cart applications where the pipe is underground, and where the cart is adapted for movement in opposite directions, lateral movement of the docking station to enable capture of a misaligned hydrant is also enabled by front and rear pairs of substantially vertical guide wings. Specifically, a forward pair of guide wings 312, 314 is fixed to respective forward ends of subassemblies 304, 306 and extend forwardly of the docking station 300, flaring outwardly in the forward direction. A rearward pair of guide wings 316, 318 is fixed to respective rearward ends of subassemblies 304, 306 and extend rearwardly of the docking station 300, also flaring outwardly but in the rearward direction. The role played by the guide wings 312, 314 and 316, 318 in assisting the capture of the hydrant flange is explained further below. For a cart that moves along an above-ground pipe, the guide wings may be omitted.

Figure 17:
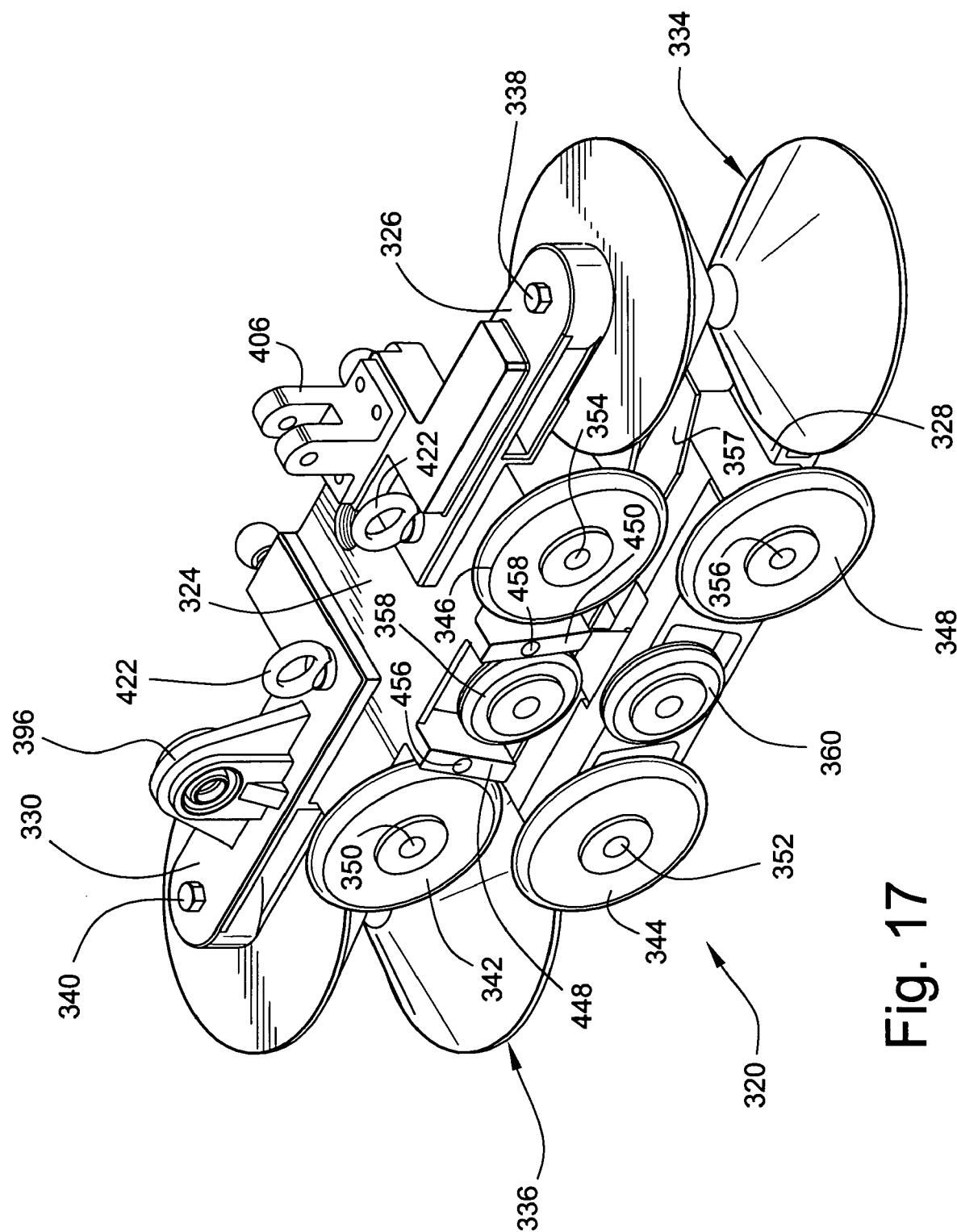
FIG. 17 is a perspective view of one of two docking station housings incorporated in the docking station shown in FIGS. 15 and 16.
Figure 18:
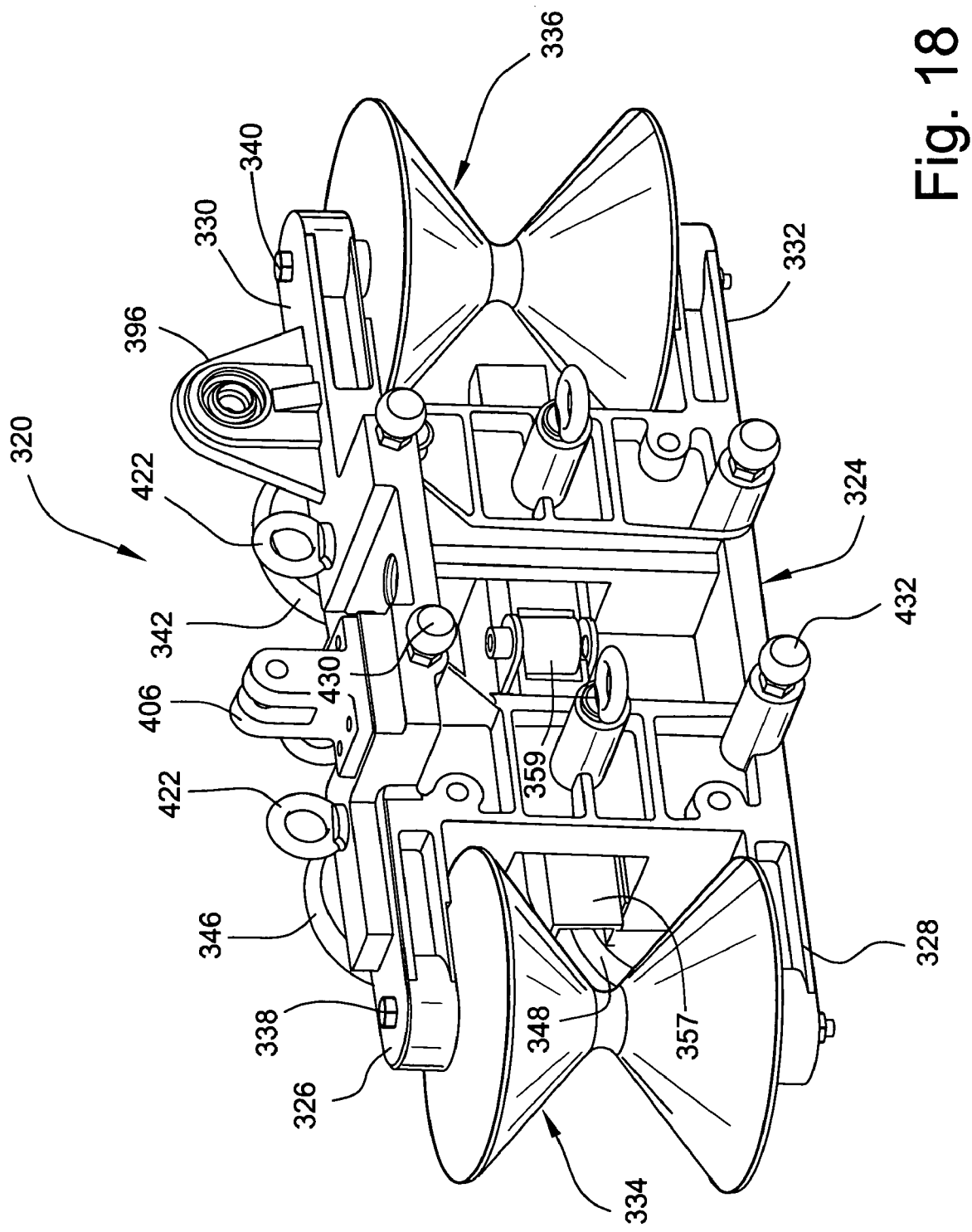
FIG. 18 is a perspective view taken from the opposite side of the docking station housing shown in FIG. 17.
Figure 19:
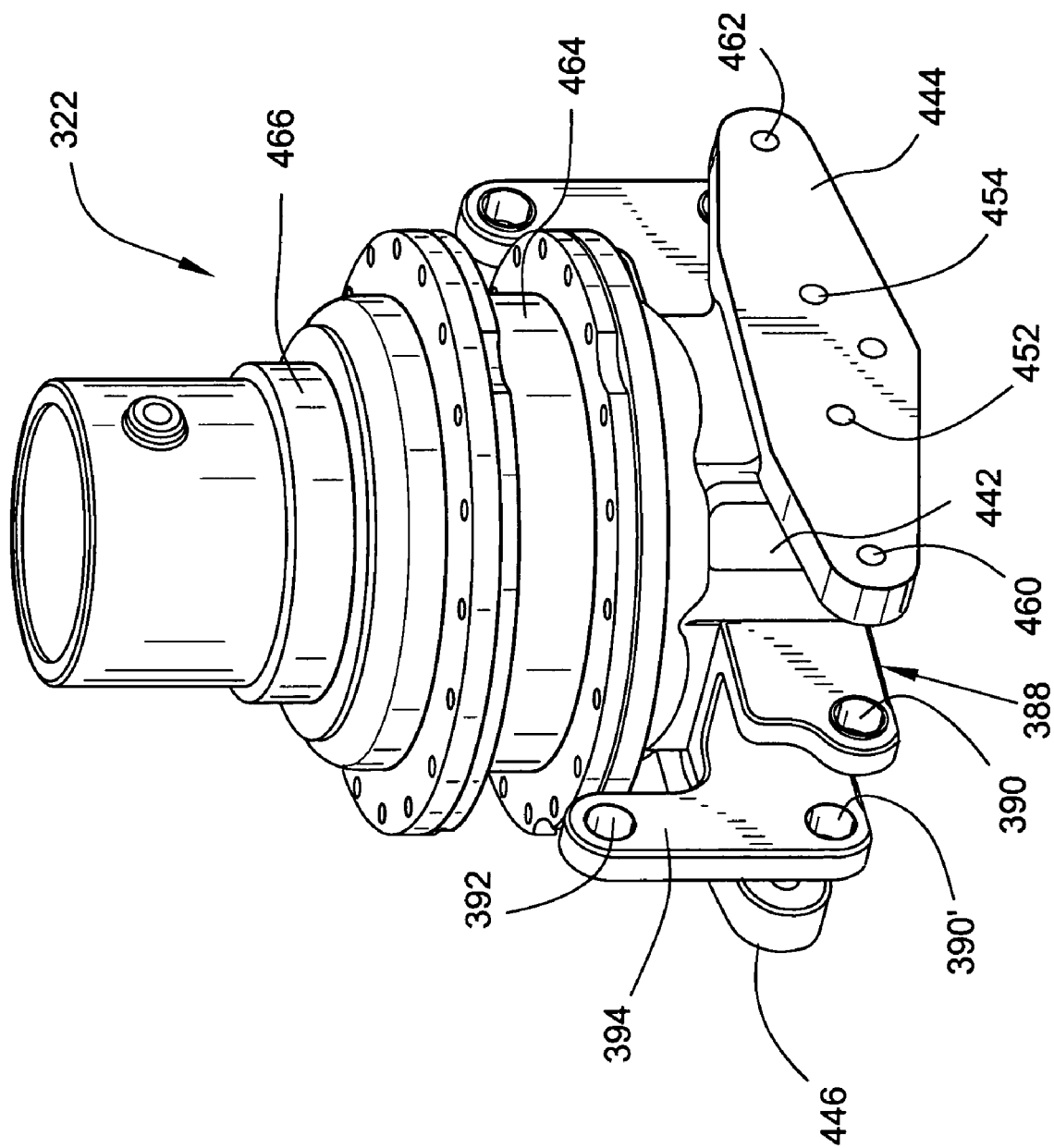
FIG. 19 is a perspective view of the hydrant valve actuator incorporated in the docking station in FIGS. 15-18.

The docking station 300 includes a pair of identical housings 320, 320' (one shown in FIGS. 15, 17 and 18) on either side of, i.e., sandwiched about, a hydrant valve actuator assembly 322 (FIG. 19). Since the housings 320, 320' are identical to one another, only one need be described in detail. As best seen in FIG. 17 (interior side) and FIG. 18 (exterior side), housing 320 includes a main body portion 324 with two pairs of oppositely directed flanges 326, 328 and 330, 332, each flange pair supporting between them a respective generally hourglass-shaped V-track roller 334, 336 for rotation about a vertical axis defined by pivot pins or bolts 338, 340. The main body portion 324 of housing 320 also supports two pair of vertically aligned guide wheels 342, 344 and 346, 348 for rotation about horizontal axes 350, 352, 354 and 356, respectively. The pairs of guide wheels are supported axially between the V-track rollers 334, 336, on the inner side of the housing 320. An additional pair of idler rollers 358, 360 may be mounted on each housing, but they are merely optional, not required. An elongated channel 357, with its open side facing inwardly, is secured to the inside of the housing 320, as best seen in FIGS. 17, 18 and 22-24, thus providing a slot or groove for receiving the docking flange 364. A side guide wheel 359 (FIG. 18) is mounted on the outside housing 320 for rotation about a vertical axis, and protrudes through an opening in the housing 320 and channel 357, also to be engaged by the docking flange. Thus, when housings 320, 320' are assembled on either side of the valve actuator assembly 322, a passageway or docking space 362 (FIG. 24) is defined by the two laterally opposed pairs of V-track rollers 334, 336 at the front and back of the docking station, the four pairs of laterally opposed guide wheels (342, 344) and (346, 348) located axially between the two pairs of V-track rollers, and the opposed channels 357. This passageway 362 is located below the valve actuator 322, and is sized and shaped to receive the round docking flange 364 (FIGS. 26-29) on the hydrant 366 as also described further below.

Figure 22:
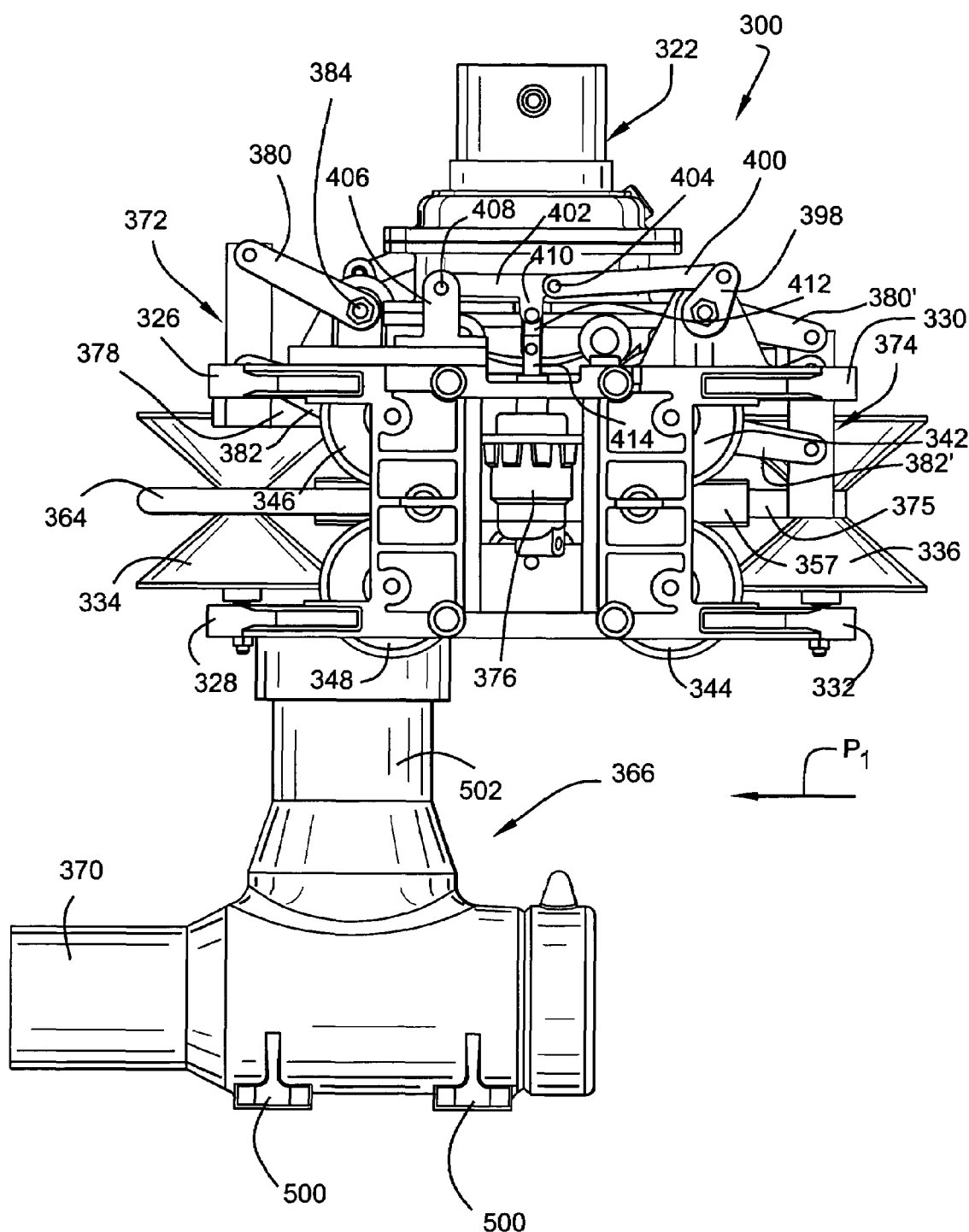
FIG. 22 is a partial simplified side elevation of the docking station when in initial engagement with a hydrant.
Figure 23:
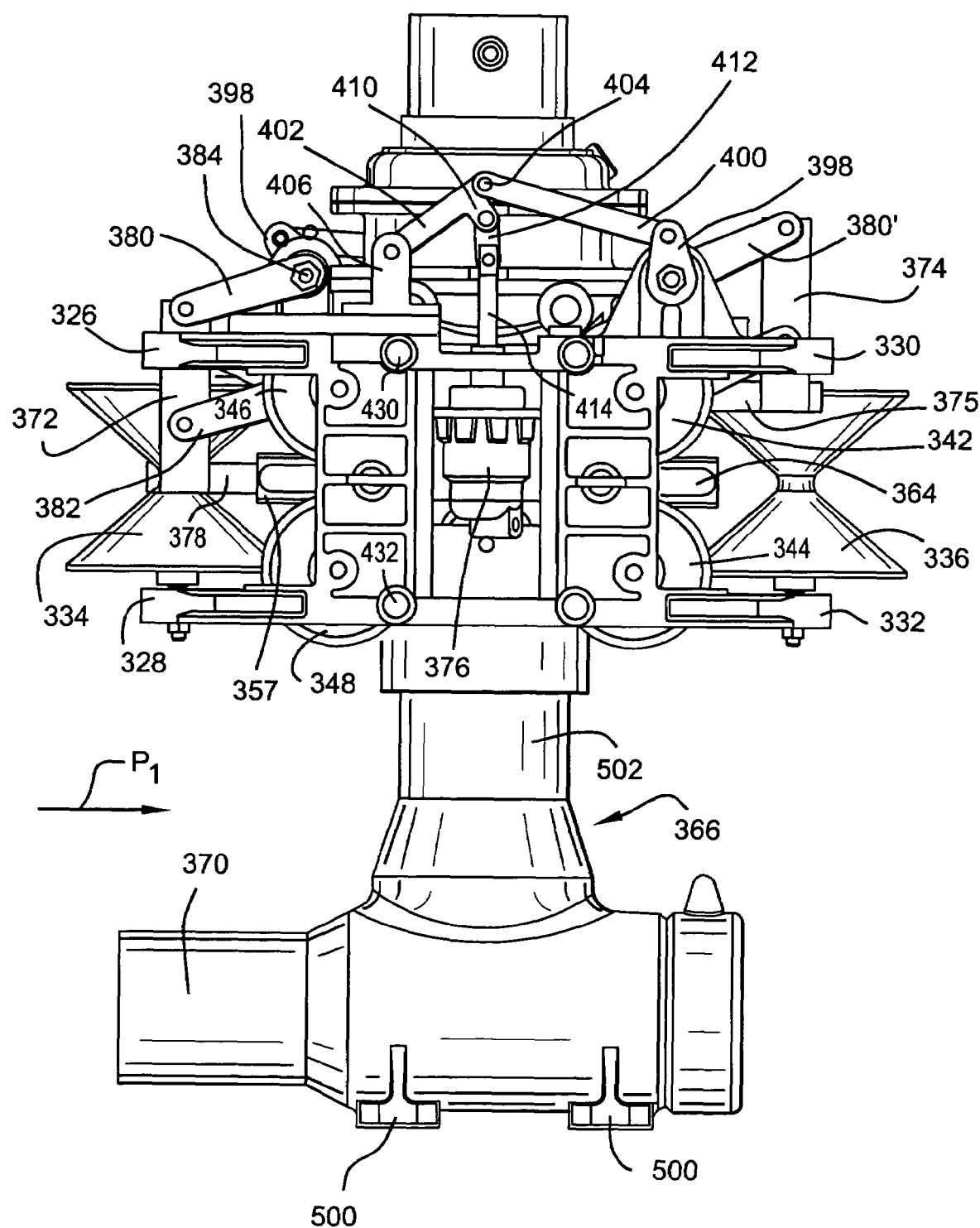
FIG. 23 is a view similar to FIG. 22 but with the hydrant fully engaged and aligned within the docking station, but with the direction of movement reversed.
Figure 24:
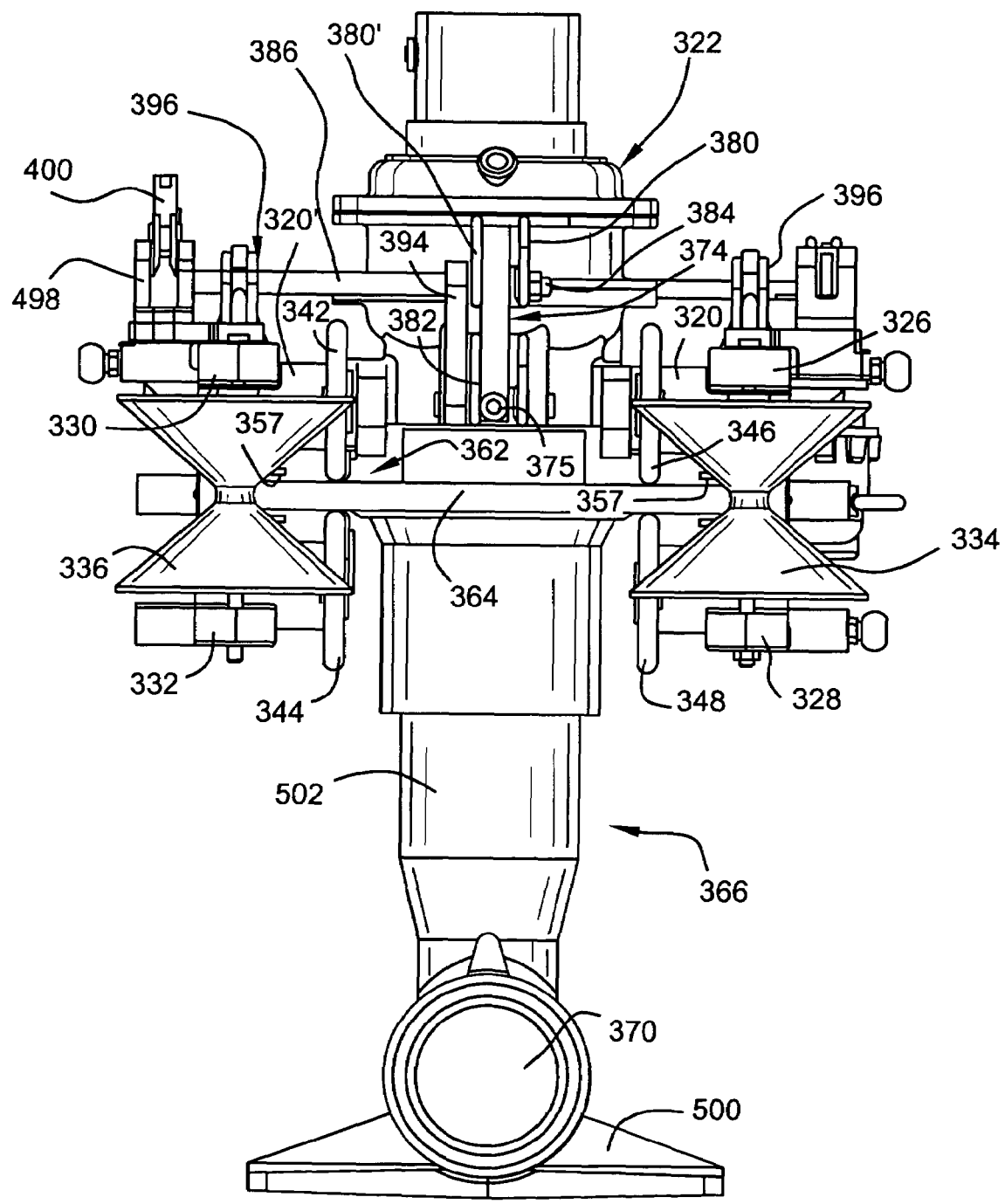
FIG. 24 is a front elevation view of the docking station and hydrant as shown in FIG. 23.
Figure 25:
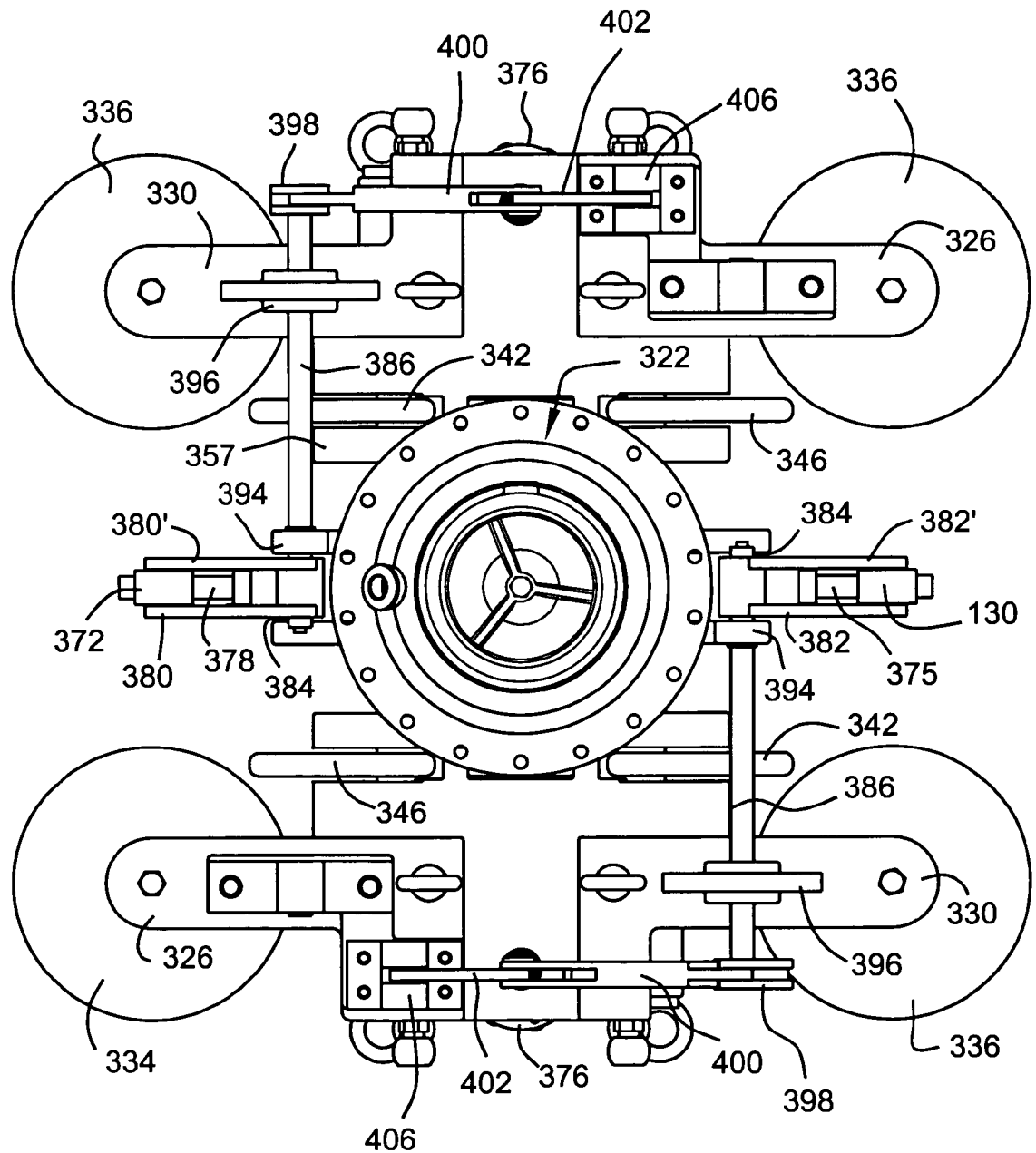
FIG. 25 is a simplified plan view of the docking station, with vertical and horizontal guide wings and suspension components removed.

Also fixed to the housings 320, 320' are a pair of optional, substantially horizontally-oriented guide wings 366, 368 (FIGS. 15 and 16), also for use when the pipe 370 is underground. The guide wings 366, 368 may be secured to the housings 320, 320' by means of bolts or any other suitable means. Wing 366 projects outwardly and upwardly in a forward direction, while wing 368 projects outwardly and upwardly in a rearward direction. These wings work in concert with guide wings 312, 314 and 316, 318 to align the docking station 300 with the hydrant 366. The vertically-oriented wing pairs 312, 314 and 316, 318 are designed to be engaged by the hydrant flange 364 when the hydrant 366 is misaligned in a lateral direction, causing the docking station 300 to move laterally in a direction dependent upon which of the guide wings is engaged. The horizontally-oriented wings 366, 368 are especially designed to assist in adjustment of the docking station 300 to a hydrant 366 that is slightly higher than a desired optimum height, i.e., when the docking flange 364 is higher than the passageway or docking space 362. Thus, when wing 366, for example, engages a hydrant flange 364, it will cause the docking station 300 to crawl upwardly over the flange 364 so that the flange can be engaged by the V-track rollers 334, 336. The V-track rollers 334, 336 will also cam the docking station 300 in a direction that brings the docking station to a position where the flange 364 is located in the center of the V-track rollers as best seen in FIGS. 22-24. Note that the profile at the narrow center of the V-track rollers 334, 336 complement the rounded profile of the peripheral edge of the flange 364.

It will be understood that for carts adapted only for movement in a forward direction, only the forward wings are required, and for carts guided by an above-ground supply pipe, all of the guide wings may be omitted.

With reference now especially to FIGS. 22-26, the housings 320, 320' and valve actuator 322 of the docking station 300 also support a pair of docking stops 372, 374 on the forward and rearward ends, respectively, of the docking station. For carts adapted to move in only a forward direction, the forward docking stop 372 and associated linkages and drive may be omitted.

Figure 26:
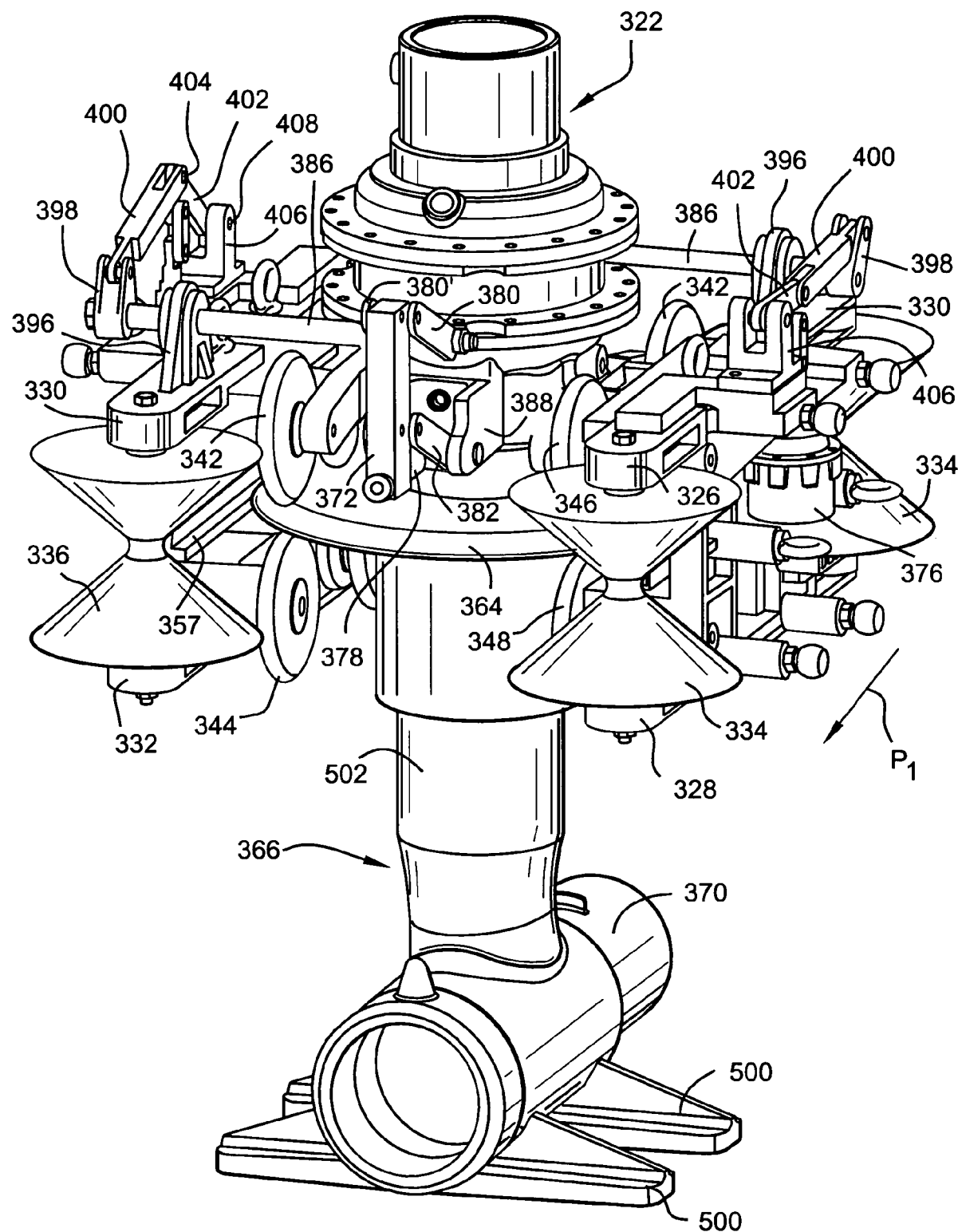
FIG. 26 is a right front perspective view of the docking station and hydrant shown in FIG. 22.

The rearward docking stop 374 is controlled by a similar linkage and actuator arrangement as forward docking stop 372, but is supported on the opposite side of the docking station 300, as best seen in FIG. 26. Note that the forward and rearward stops and their associated linkage and drives are mirror images of one another, with an actuator 376 mounted on each side of the docking station 300, i.e., one actuator is mounted on the housing 320 and the other actuator is mounted on the opposed housing 320'. For convenience and clarity, and with the exception of stops 372, 374 themselves, the links, shafts and bearing supports for each stop have the same respective reference numerals.

The forward docking stop 372 is in the form of a vertically-oriented bar combined with a horizontally-oriented proximity sensor 378 at its lower end. The stop 372 is pivotally supported by two sets of parallel links 380, 380' and 382, 382'. The upper set of links 380, 380' is pivotally attached at a forward end to the upper end of stop 372 via a pivot pin, and at a rearward end to end 384 of a shaft 386. The lower set of links 382, 382' is pivotally attached at a forward end to the lower end of the stop 372 and at a rearward end to a clevis 388 (FIG. 19) secured to the housing of the valve actuator 322. In this regard, the pivot pin or bolt (not shown) extends through holes 390, 390' in the clevis. This parallel linkage arrangement allows the stop 372 to move essentially vertically up and down between lowered (stop) and raised (go) positions upon rotation of shaft 386.

Shaft 386 is supported within a journal bearing 392 in an extended side 394 of the clevis 388, and in a bearing stand 396 on the housing 320. The free end of the shaft 386 adjacent the stand 396 mounts a clevis 398 for pivoting movement upon rotation of the shaft. A forward end of an adjustable link arm 400 is pivotally mounted within the free end of the clevis 398. The rearward end of the link arm 400 is pinned to a forward end of a second link arm 402 via pin 404. The rearward end of the second link arm 402 is pivotally mounted in a clevis 406 (via pin 408) also supported on the housing. Adjacent the forward end of the second link arm (i.e., adjacent pin 404), a right angle arm 410 is pivotally attached to a rigid connecting link 412 fixed to an output shaft 414 of the hydraulic actuator 376. When the shaft 414 is extended, link 402 will pivot in a counterclockwise direction, thereby pulling the first link 400 upwardly and rearwardly. This movement causes the clevis 398 and thus shaft 386 to rotate in a counter-clockwise position. As a result, the parallel linkage comprised of link sets 380, 380' and 382, 382' will also rotate in the same direction, raising the stop 372 to a retracted or "go" position. Retraction of output shaft 414 will have the opposite effect, i.e., lowering the stop 372 to an extended or "stop" position. Operation of the docking stops 372, 374 will be described in detail further below.

As in the first-described embodiment, the docking station 300 itself is suspended or hung from its supporting frame 302 so as to allow the docking station to "float" to a limited extent in essentially any direction to facilitate capture of the hydrant. Specifically, and with reference again to FIGS. 15 and 16, the docking station 300 is resiliently suspended from its supporting frame 302 by means of four coil springs (two shown at 416, 418 in FIG. 15) extending vertically between eyebolts (or other suitable points of attachment) secured to the inside surfaces of the horizontal members 420, 421 of the inverted U-shaped subassemblies 304, 306 and eyebolts (or similar) 422 (see FIG. 17) on respective upper surfaces of housings 320, 320'. In the exemplary embodiment, one pair of springs is attached to the top of housing 320, and the other pair of springs is attached to the top of housing 320', such that the four coil springs are arranged in a generally rectangular pattern. These springs permit spring-biased up and down movement of the docking station, and also permit limited side-to-side, front-to-back, and compound movements, i.e., tilting, and twisting and/or swiveling movements.

Figure 15:
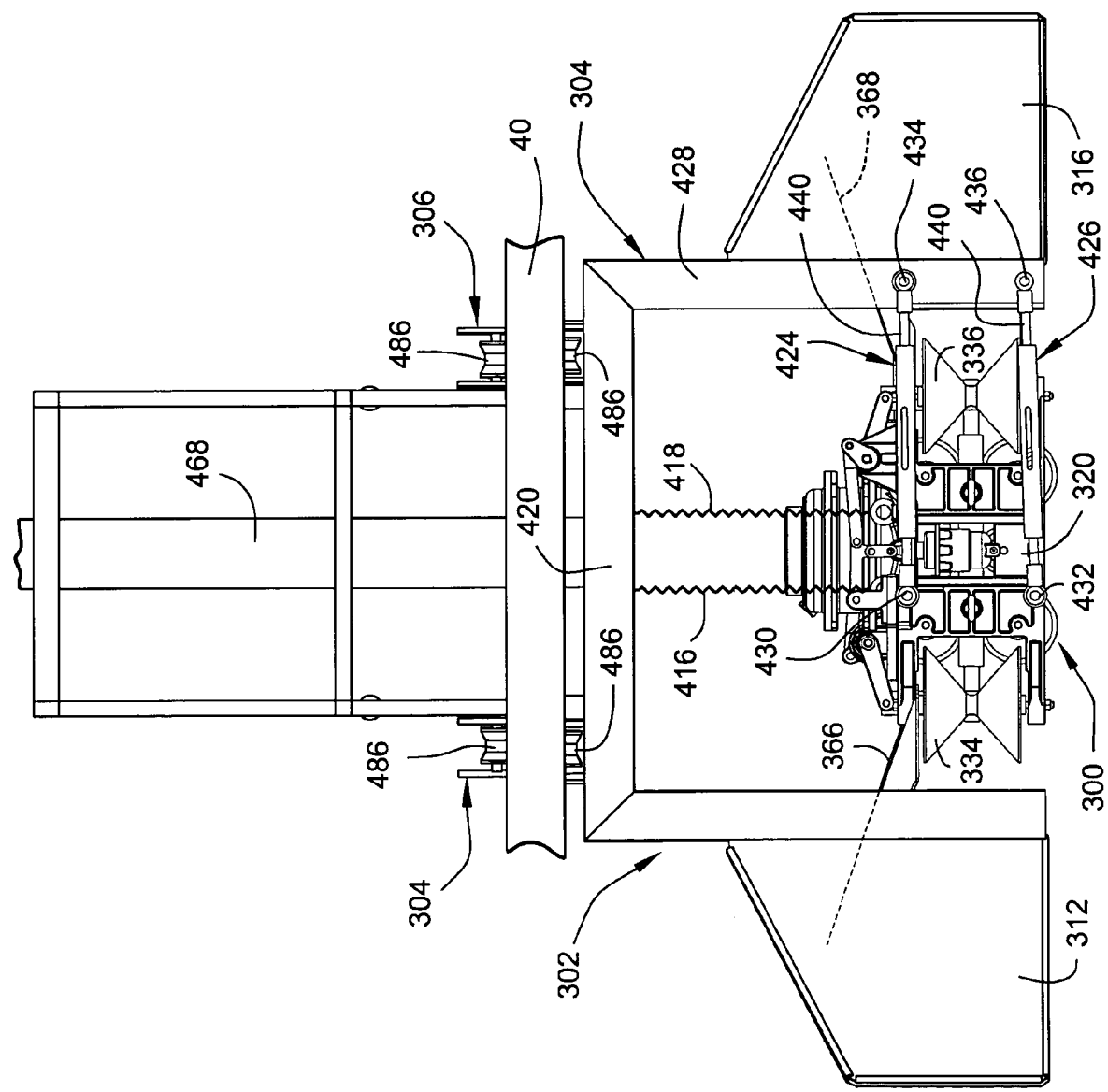
FIG. 15 is a side elevation of a docking station module in accordance with a second exemplary embodiment of the invention.
Figure 16:
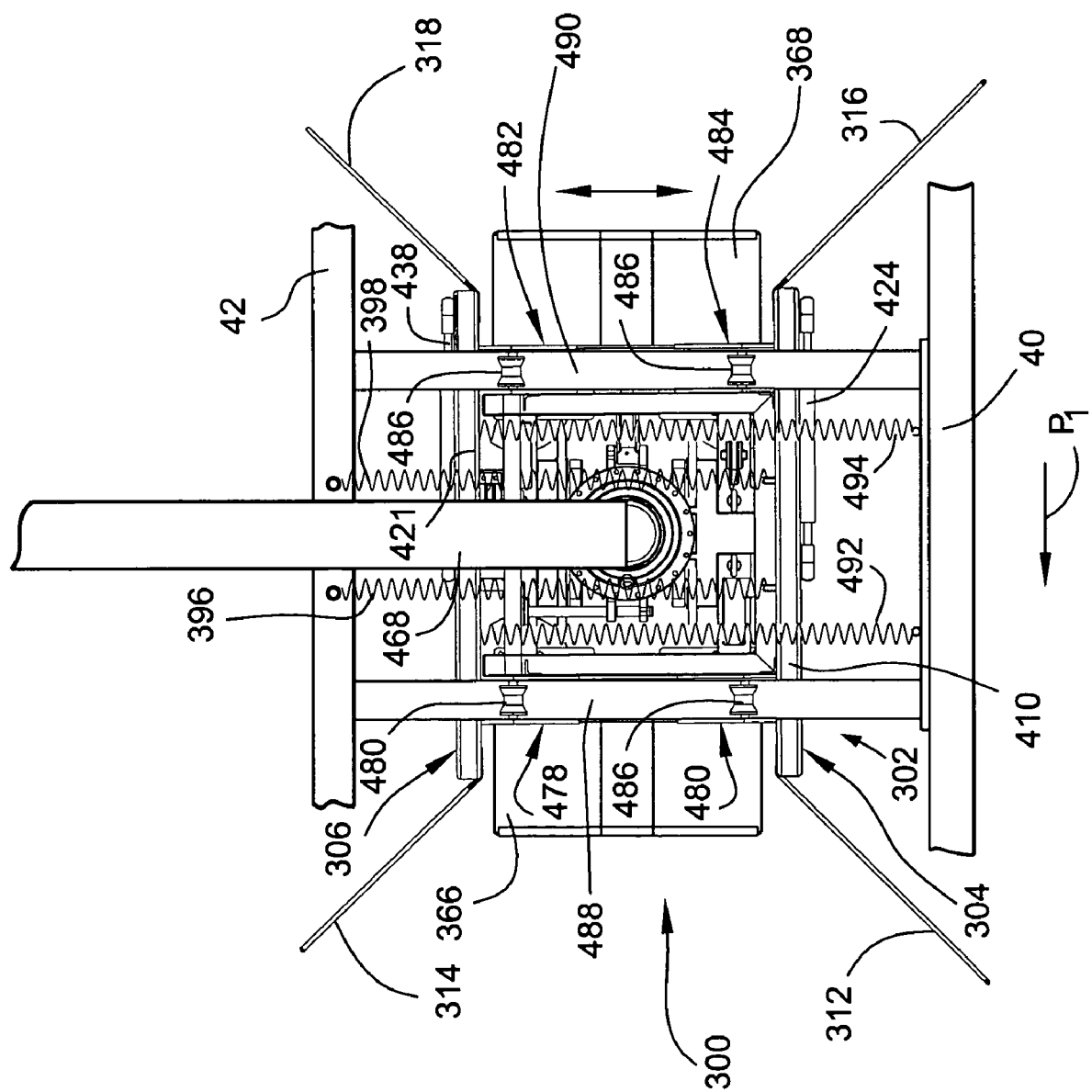
FIG. 16 is a top plan view of the docking station shown in FIG. 15.

A first pair of spring-loaded, compressible tie rods 424, 426 (FIG. 15) is secured substantially horizontally between the rearward vertical member 428 of the U-frame subassembly 304, and the housing 320 via universal bushing mounts 430, 432 and 434, 436 (FIGS. 15, 18), while a second pair of similar tie rods (one shown at 438) is secured in a similar orientation between the rearward vertical member of the other U-frame subassembly 306 and housing 320', utilizing similar bushing mounts (not shown). Note that additional bushing mounts (unnumbered) are available on the housings 320, 320' (FIG. 18) to provide other optional mounting arrangements. For each tie rod, and as best seen in FIG. 15, a "piston" 440 is movable within the tie rod against a bias established by internal springs. Such tie rods are well known to those skilled in the art. The use of universal bushing mounts 430, 432 and 434, 436 with the tie rods, permits some degree of side-by-side, up and down and compound movements, in concert with the vertically-oriented springs 416, 418, etc. Note also that the compressible tie rods (compressible in two opposite directions) also serve as shock absorbers in that they accommodate a limited degree of "over travel" by the cart during docking.

With this arrangement, the docking station 300 "floats" relative to its supporting frame 302 (and to a hydrant 366) for movement in at least three mutually perpendicular directions, i.e., vertical, horizontal front-to-back (and vice versa), and horizontal side-to-side. In addition, limited compound movements, i.e., tilting, twisting and/or swiveling and combinations thereof, are also possible by reason of the flexible nature of the vertically-oriented springs in combination with the tie-rod universal mounting arrangements. These multiple degrees of freedom of movement permit reliable and accurate docking with hydrants 366 even when the latter are out of alignment relative to the docking station 300.

The hydrant valve actuator assembly 322 includes a lower housing 442 provided with a pair of attachment flanges 444, 446 (FIG. 19) by which the valve actuator assembly 322 is secured between the housings 320, 320'. Specifically, the assembly 322 and housing 320 via bolts extending through holes 460 and 462 in attachment flange 444 and holes 350 and 354 in guide wheels 342, 344 that extend into the housing 320. Dowel pins (not shown) extending between holes 456, 458 in angled ribs 448, 450 and holes 452, 454 in the attachment flange 444 may be used to align the attachment flange with the housing. The assembly 322 is secured to housing 320' in an identical manner.

The valve actuator assembly 322 also includes intermediate and upper housing portions 464, 466 that, combined with lower housing 442, enclose the valve actuator, as also described further below. A flexible hose 468 (FIGS. 15 and 16) connects the actuator assembly 322 to the sprinkler on the cart.

Figure 20:
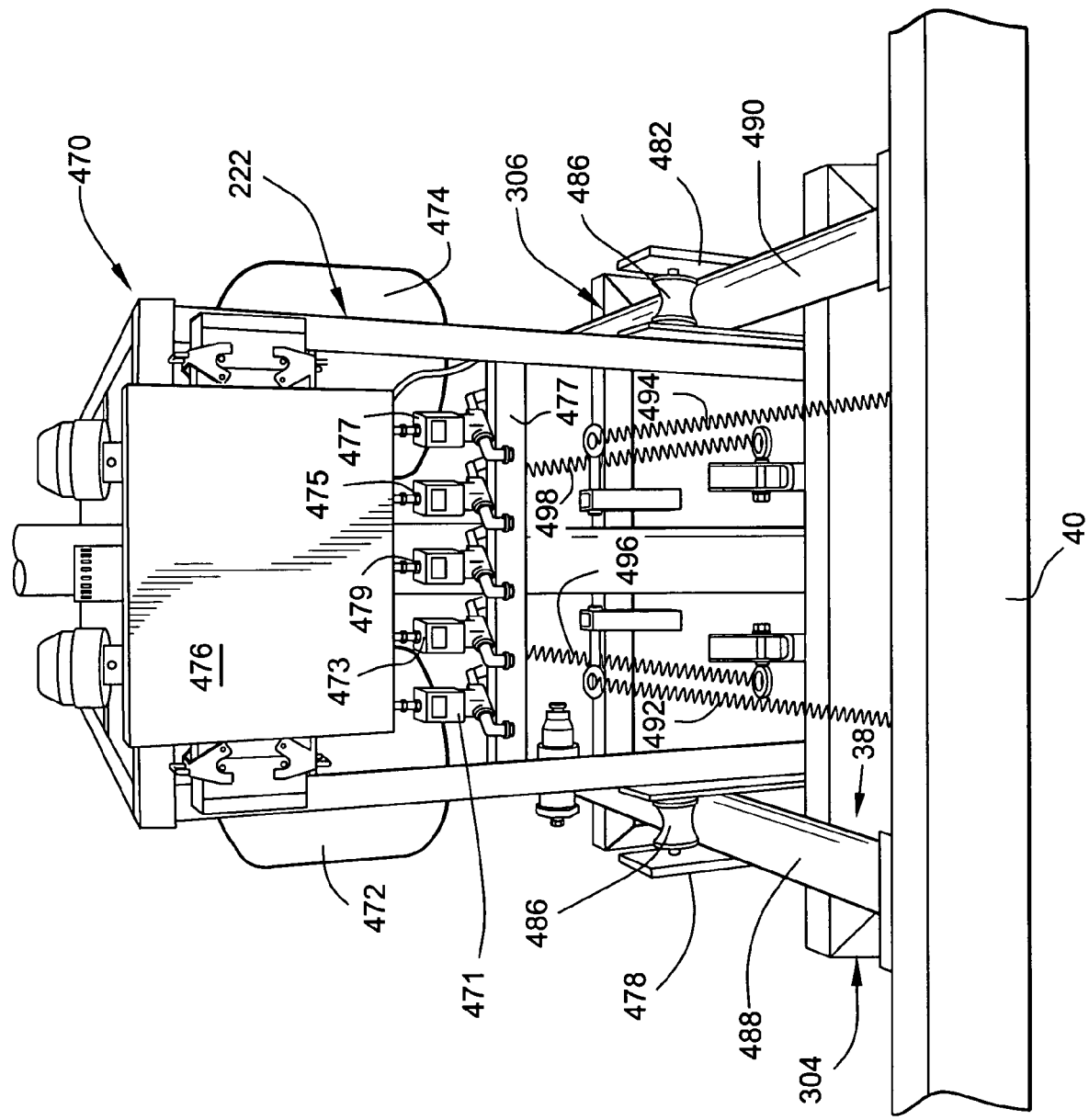
FIG. 20 is a partial perspective view of an upper portion of the docking station, shown in FIGS. 15-18.
Figure 21:
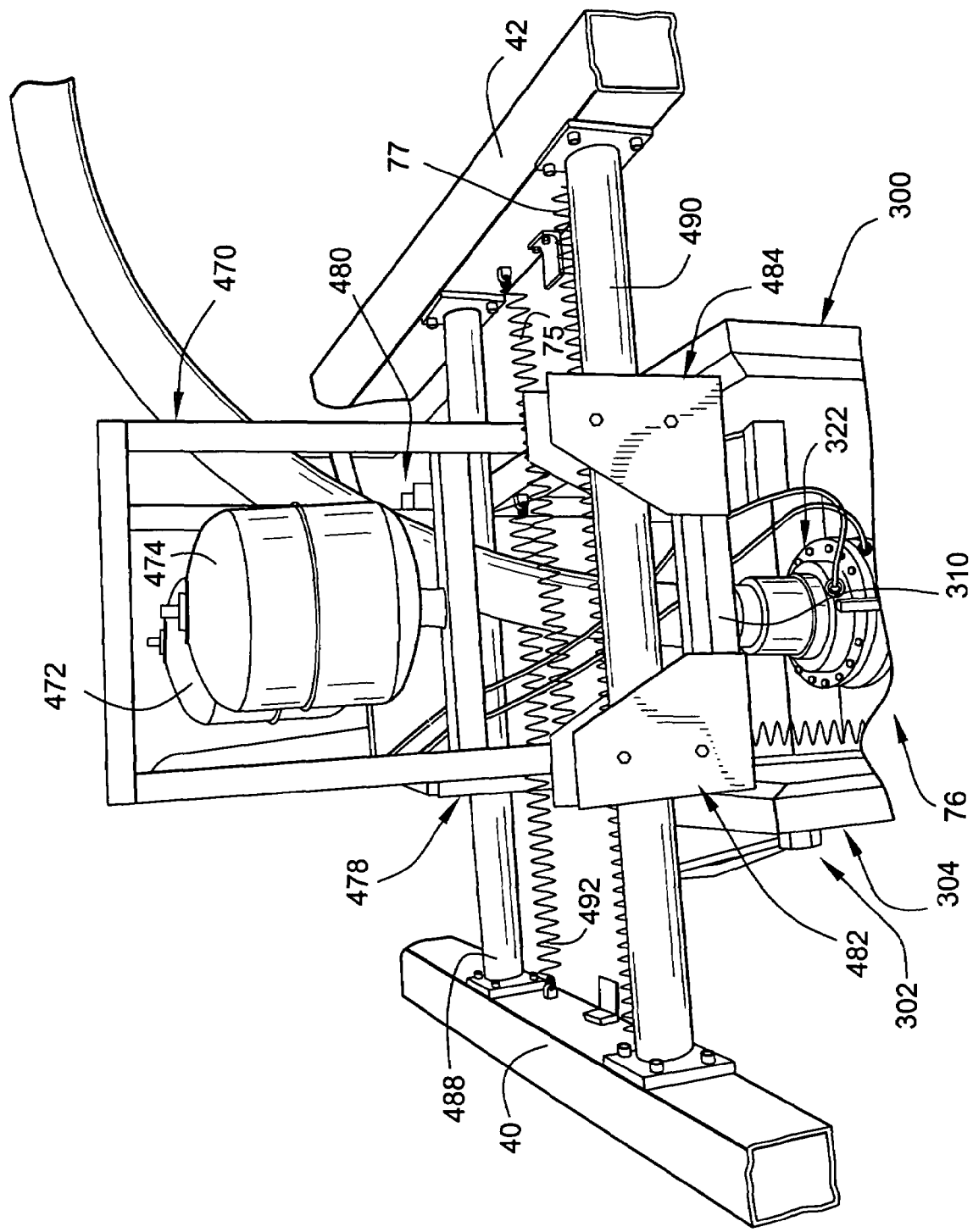
FIG. 21 is a perspective view similar to FIG. 20, but rotated 90°.

With reference now to FIGS. 20 and 21, an additional upper box frame 470 may be mounted on the supporting frame 302. This upper frame may support a pair of pressure accumulators 472, 474 and a control panel or box 476 housing the PLC 469. Pressure accumulators 472, 474 are arranged in parallel and are used to supply water under pressure to the valve actuator 322, and are similar to the pressure accumulator 204 described above. The use of a pair of pressure accumulators is particularly useful for larger systems that utilize higher capacity water supply valves and valve actuators. If desired, the pair of 12-volt batteries 30, 32 described earlier could be relocated to the upper frame 270 along with the component control solenoids. As best seen in FIG. 20, a solenoid bank may be arranged below the relocated control box 476 and the solenoids supported on, for example, a cross member 477 of the upper frame 470. Thus, the solenoids are supported below but connected between the control box 476 and various controlled components such as the dock stop actuators 376, the valve actuator 322 and the main water control valve 203 (FIGS. 1 and 14). More specifically, for this embodiment, solenoids 471 and 473 control the flow of water to and from the valve actuator 322. Solenoids 475 and 477 control the movements of docking stops 372, 374 and solenoid 479 controls the main water control valve 203.

Another optional suspension feature may include the addition of two pairs of roller mounting flanges 478, 480 and 482, 484 (FIG. 21) to the supporting frame 302, each flange pair mounting two rollers 486 (four total shown in FIG. 16) such that the supporting frame 302 is movable laterally, in a direction perpendicular to the path $P_1$ along a pair of pipes or rails 488, 490 fixed between, for example, cart side rails 40, 42 (FIG. 1). This arrangement provides a lateral adjustment feature for the docking station 300 relative to the cart (and hydrants) as described further herein. As best seen in FIGS. 20 and 21, a first pair of horizontally-oriented coil springs 492, 494 are connected between the side rail 40 and vertically-oriented brackets on the top of the inner U-shaped subassembly 306, while a second pair of horizontally-oriented coil springs 496, 498 extend between the inner side rail 42 and vertically-oriented brackets on the top of the outer U-shaped subassembly 304. This arrangement maintains the docking station 300 (described below) in a generally centered position along the rails 488, 490 (between cart frame side rails 40 and 42), but also permits reciprocatory spring-biased movement of the docking station 300 in opposite directions along the rails 488, 490. With this feature, the docking station 300 is able to accommodate various degrees of misalignment of any one or more of the hydrants 366, and is particularly useful when the supply pipe is underground and not available as a guidance mechanism.

Figure 27:
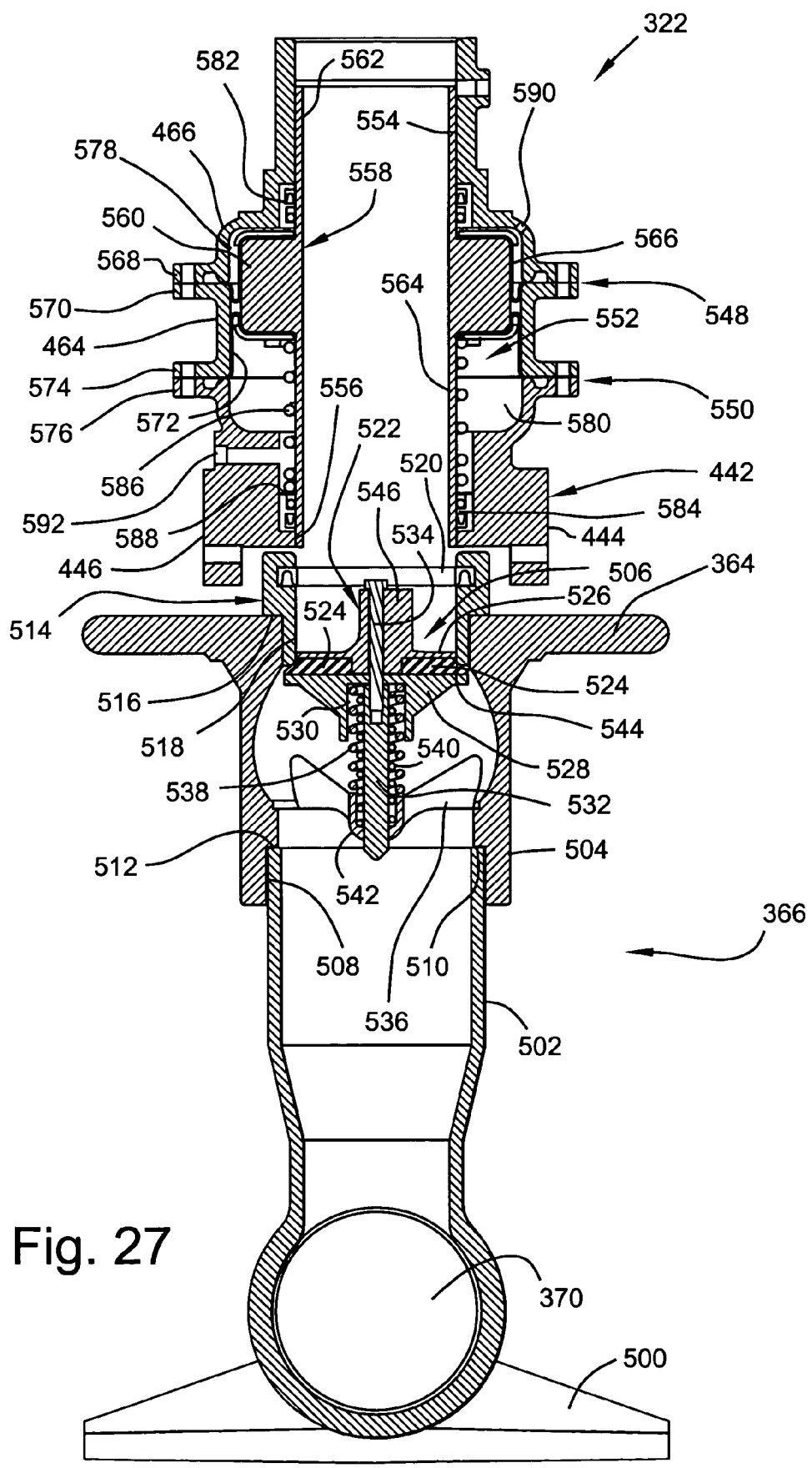
FIG. 27 is a cross section taken through the hydrant valve and hydrant valve actuator, in a valve closed position and with the hydrant fully engaged within the docking station.
Figure 28:
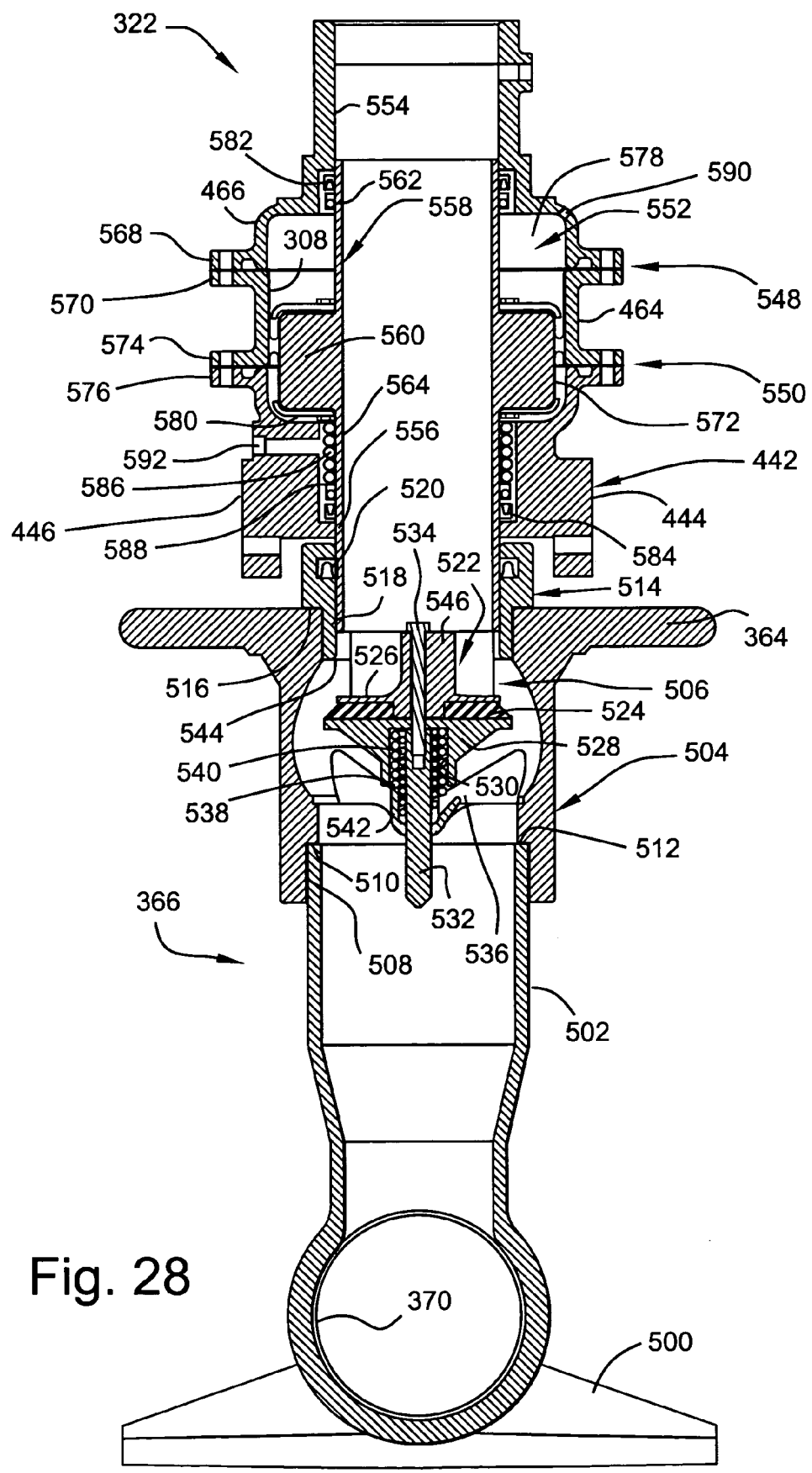
FIG. 28 is a view similar to FIG. 27 but with the hydrant valve shown in a valve open position.
Figure 29:
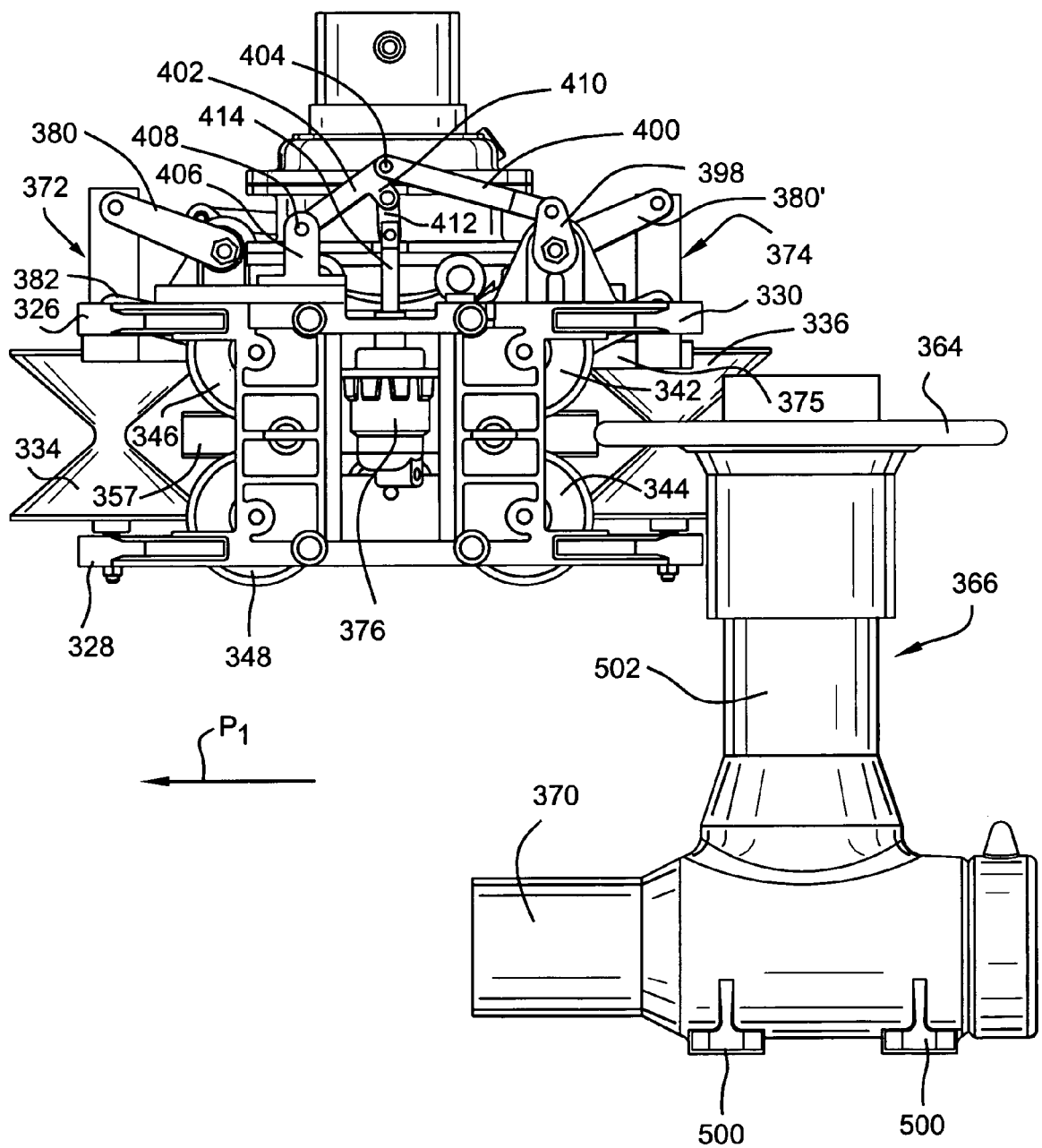
FIG. 29 is a view similar to FIG. 23 but showing the docking station disengaged and moving away from the hydrant.

Turning now to FIGS. 27 and 28, a hydrant or water supply valve 366 is shown extending upwardly from the supply pipe 370. One or more riser footings 500 may be used to stabilize the hydrant. The hydrant includes a vertical riser 502 on which a valve housing 504 including the integral docking flange 364 is secured in telescoping relationship. The valve housing 504 encloses and supports a water supply valve assembly 506 in a generally vertical orientation. The valve housing 504 is formed with a lower opening 508 with an adjacent, interior shoulder 510 by which the housing 504 is supported on the upper edge 512 of the riser 502. The manner in which the valve housing 504 is secured is within the skill of the art and may include threaded attachment, welding or other suitable means.

The upper end of the housing 504 supports a valve cup 514 formed with an external shoulder 516 that permits the cup 514 to be seated on the valve housing 504, with a smaller diameter lower portion 518 telescoped into the valve housing. A flexible annular seal 520 is seated in a groove formed in the interior of the cup. The valve assembly or simply "valve" 506 also includes an elongated stem assembly 522 with an annular Buna-Nitrile (or other suitable material) valve seal 524 sandwiched between upper and lower valve seal supports 526, 528. The lower support 528 is counterbored to create a spring recess 530 (FIG. 27). A stem 532 is attached to the upper support 526 by threaded engagement of bolt 534. The bolt 534 accesses the lower support 528 by means of a bore in the upper support 526. The stem 532 extends downwardly and through a guide spider 536 fixed near the lower end of the valve housing. A pair of coil springs 538, 540 extend between the spring recess 530 and the hub 542 of the guide spider 536, thereby biasing the valve assembly 506 upwardly to a normally closed position, with valve seal 524 engaged with annular seat 544 at the lower end of cylinder 514. The upper support 526 is also formed as a spider, with three radial webs 546 (2 partially shown) extending radially outwardly to the interior wall of the cup 514, thus permitting flow out of the hydrant while also providing an engagement interface for the hydrant valve actuator piston/cylinder as described further below.

As already mentioned, the hydrant valve actuator assembly 322 includes a three-part housing including the upper housing portion 466, the intermediate housing portion 464 and the lower housing portion 442, joined together at flanged interfaces 548, 550 by bolts or other suitable means (not shown). Relatively large diameter portions of the upper and lower housing portions 446, 442 in combination with the intermediate portion 464 create an enlarged interior chamber 552 axially between upper and lower smaller-diameter internal, cylindrical bores 554, 556.

A unitary piston/cylinder 558 is slidable within the housing, with the piston or flanged portion 560 confined to movement within the enlarged chamber 552. An upper cylindrical part 562 of the piston/cylinder 558 slides within the upper internal bore 554 while a lower cylindrical part 564 slides within the lower internal bore 556. A first rolling diaphragm 566 is fixed between the upper end of the piston 560 and radial flanges 568, 570 at the interface 548 between the upper and intermediate housing portions 466, 464. Similarly, a second rolling diaphragm 572 is fixed between the lower end of the piston 560 and the radial flanges 574, 576 at the interface 550 between the intermediate and lower housing portions 464, 442. This arrangement creates an "extend" cavity 578 above the diaphragm 566 and a "retract" cavity 580 below the diaphragm 572 for fluid acting on opposite sides of the piston 560.

Fluid seals (O-rings or the like) 582, 584 are located in respective upper and lower housing portions 466, 442 to prevent fluid leakage from chamber 552 along the internal bores 554, 556. A spring 586 is located between an interior shoulder 588 at the lower end of the lower housing section 442 (formed by a counterbore in the lower internal bore 556) and the lower side of the piston 560 to normally bias the piston-cylinder 560 in an upward direction, to the retracted position shown in FIG. 27. A first port 590 is provided in the upper portion of the housing for introduction/exhaustion of fluid into or from the extend cavity 578 and a second port 592 is provided in the lower housing section 442 for introducing/exhausting fluid into or from the retract cavity 580.

The operation of a two-directional cart is described below, with the cart as shown in FIGS. 1-5 modified as necessary for use with an underground supply pipe. As the cart is driven forward in the direction of path $P_1$ (FIG. 1), the forward docking stop 372 is in the up or go position, while the rearward docking stop 374 is in the lowered or stop position (FIG. 22).

As the cart continues to move in a forward direction, the hydrant flange 364 and docking station 300 are initially roughly aligned, if necessary, by the interaction of the flange 364 with the front guide wings 312, 314 and front guide wing 366. Assuming the hydrant flange 364 and docking station 300 are not in substantial alignment during the initial contact, the vertically-oriented front guide wings 312, 314 (and/or the horizontally-oriented forward guide wing 366) will be engaged by the stationary hydrant flange 364, causing the docking station 300 to move laterally along the rails 488, 490 to a generally laterally aligned position, while engagement with wing 366 will cause the docking station 300 to move upwardly as the docking station continues to move toward the hydrant. The flange 364 will then be engaged by the forward pair of V-track rollers 334, 336 the tapered surfaces of which further center the flange 364 relative to the docking station so that the flange is located at the smallest-diameter portion of the V-track rollers, as best seen in FIG. 24. In other words, the V-shape of the spinning rollers 334, 336 allows the free-floating docking station 300 to crawl around the hydrant flange 364 until they are aligned. The hydrant flange 364 then slides between guide wheels 342, 344, 346, 348 and into the side guide channel members 357 which capture the hydrant flange 364 in substantially the same plane as the docking station.

In an alternative arrangement, a power-assist feature may be added to facilitate lateral movement of the docking station on the rails 488, 490 upon engagement of the hydrant flange 364 with one or the other of guide wings 312, 314 and 366. This would function in a manner similar to power brakes or power steering in a vehicle, and could employ oil hydraulics, water hydraulics, pneumatics, or electric motors to move the docking station along the rails 488, 490.

Figure 30:
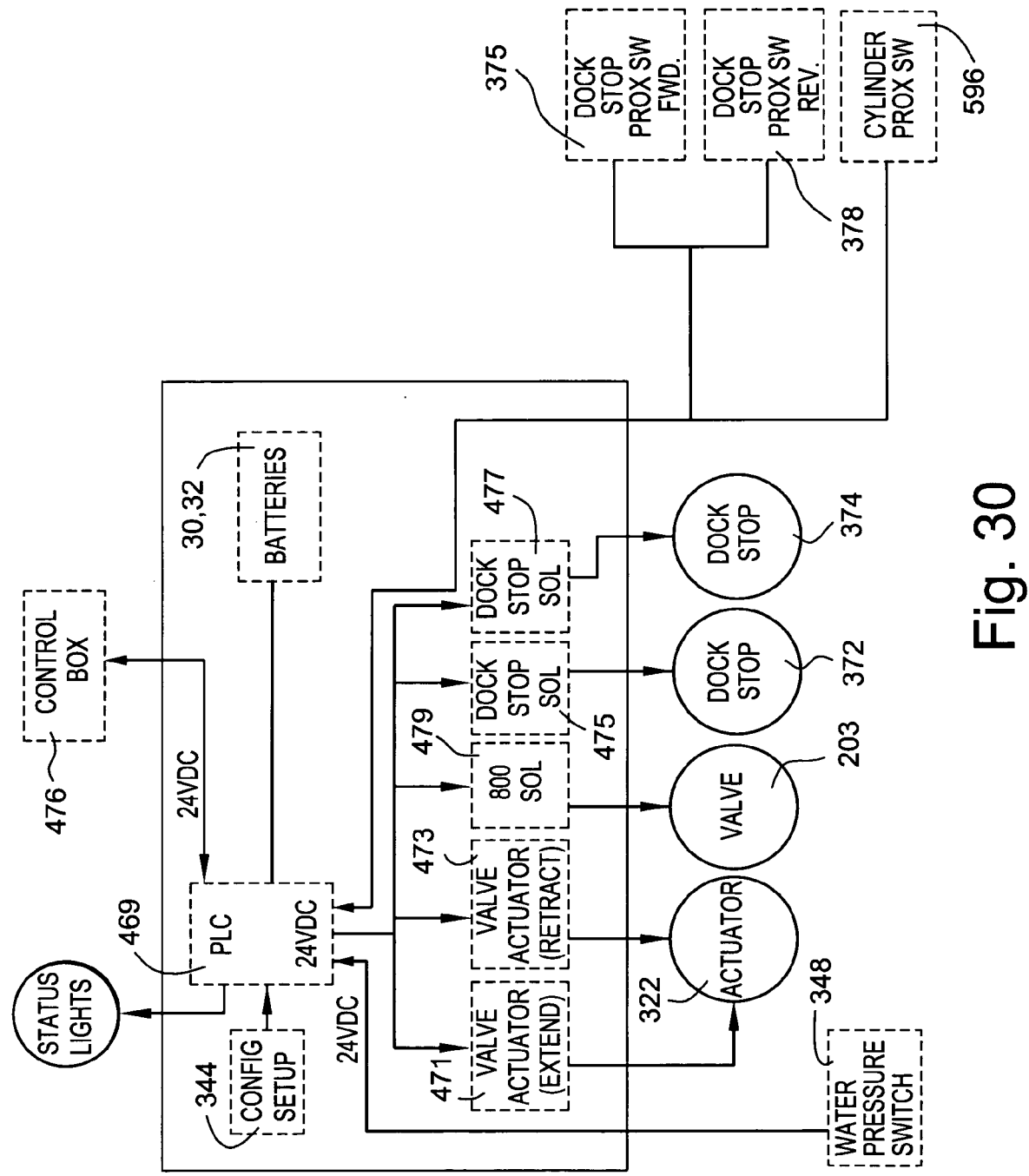
FIG. 30 is a schematic diagram of the control system for the cart and docking station of the second embodiment.

With further reference also to FIG. 30, as the hydrant flange 364 is captured by the docking station 300, the cart 12 continues forward travel until the hydrant flange 364 engages the rearward docking stop 374. More specifically, when the docking stop proximity switch 375 (part of the stop) is tripped (for example, when the flange 364 is within a few millimeters of the stop), it signals the PLC 469 in the control panel box 476 to stop the forward movement of the cart. At this point, the cart "coasts" into engagement with the docking stop 374. The hydrant flange 364 is now fully captured by the docking station 300, and the cart is in position to connect to the water supply valve. Depending on the normal operating speed of the cart, a second proximity switch may be used "upstream" of the switch 375 for the purpose of effecting a reduction in speed of the cart as it approaches the hydrant, as described in connection with the first embodiment. If desired, the speed control feature of the first-described embodiment may be employed here as well.

When the docking station 300 is fully aligned with the hydrant water supply valve housing 504, only the flange 364 is engaged with the docking station. In other words, the docking station self-aligns with the flange 364, the alignment determined by the docking stop 374, the laterally opposed and axially spaced pairs of guide wheels 342, 344 and 346, 348, and the opposed, horizontally-oriented channel members 357 and associated side-guide wheels 359 on the interior sides of the housings 320 and 320'. Note that in the fully aligned position, the docking flange 364 is located between and axially spaced from the forward and rearward V-track rollers 334, 336.

The PLC 469 now sends a command to port water from the pressure accumulators 472 and 474 through the extend on/off control solenoid valve 471 to the extend diaphragm cavity 578 in the actuator assembly 322. At the same time, the main water retract on/off solenoid valve 473 vents water from the retract cavity 580. The water force in the extend cavity 578 overcomes the force of spring 586 and pushes the lower cylinder part 564 down into the hydrant valve housing 504. The cylinder part 564 eventually travels through the valve cup 514, and as the cylinder continues its downward movement, the valve seal 524 is pushed off the valve seat 544 to thereby open the valve. After extend on/off control solenoid 471 has been signaled by the PLC, a time delay allows sufficient time for system water pressure to recharge both pressure accumulator tanks 472, 474 (as needed). After the time delay, the PLC 469 sends a command to solenoid 479 to open the control valve 203 so that water is then free to flow via the valve through the piston-cylinder 558 to the sprinkler 28.

After the sprinkler has run for the programmed amount of time, the PLC 469 sends a command to solenoid 479 to close the control valve 203 to prevent water from draining out of the sprinkler. The PLC 469 then sends a command to vent water from the "extend" cavity 578 through the main water extend on/off control solenoid valve 471 to atmosphere. This removes the downward force on the rolling diaphragm 566. At the same time, the PLC 469 sends a command to port water to the "retract" cavity 580 through the main water retract on/off control solenoid valve 473. The springs 586 and diaphragm 572 now push the piston-cylinder 558 back up into the actuator housing to the position shown in FIG. 27. As the piston-cylinder 558 retracts, the valve seal assembly 506 is pushed upward by the valve springs 538, 540 until the valve seal 524 seats on the valve seat 544 and shuts off water flow. When a proximity switch 596 senses the actuator piston-cylinder 558 is retracted, the PLC 469 initiates forward movement of the cart to the next hydrant. To initiate such forward movement, water is first ported through the solenoid 477 that operates hydraulic actuator 376. The hydraulic actuator 376 extends its output shaft 414 to thereby raise the stop 374 out of the path of the flange 364 to the retracted or "go" position. The cart then begins to drive forward to the next hydrant. When the docking station is disengaged from the hydrant flange, the springs 492, 494 and 496, 498 will return the docking station to its centered position along trolley rails 488, 490. Following a programmed time delay to ensure that the docking station 300 has cleared the hydrant, the PLC sends a command to solenoid 477 to port water from the hydraulic actuator 376 to atmosphere. The hydraulic actuator rod 414 is forced to retract by an internal spring, rotating the docking stop 374 to its extended or "stop" position. The dock stop 374 is now in position to stop the docking station at the next hydrant. It will be appreciated that dock stop 372 will operate in the same manner when the cart travels in the opposite direction. Thus, stop 372 is always retracted when the cart travels along path $P_1$, and stop 374 is always in the retracted position when the cart travels along opposite path $P_2$.

In the above-described embodiments, water from the irrigation pipes is used as a hydraulic drive fluid. A closed hydraulic system employing standard hydraulic fluids, a pump, reservoir, and filter could also be employed. A water glycol fluid is currently under consideration. A pneumatic system could also be used employing a compressor, filter and reservoir. An electric jack screw or actuator could also connect to the valve actuator and be used to drive it up and down into the hydrant valve.

The hydraulic control lines that feed the "extend" and "retract" cavities on the valve actuator assembly can have in-line orifices to provide flow rate control in and out of their respective cavities. This will control how fast the valve will turn on and off. By controlling valve opening and closing speed, water hammer will be kept to a minimum.

Figure 31:
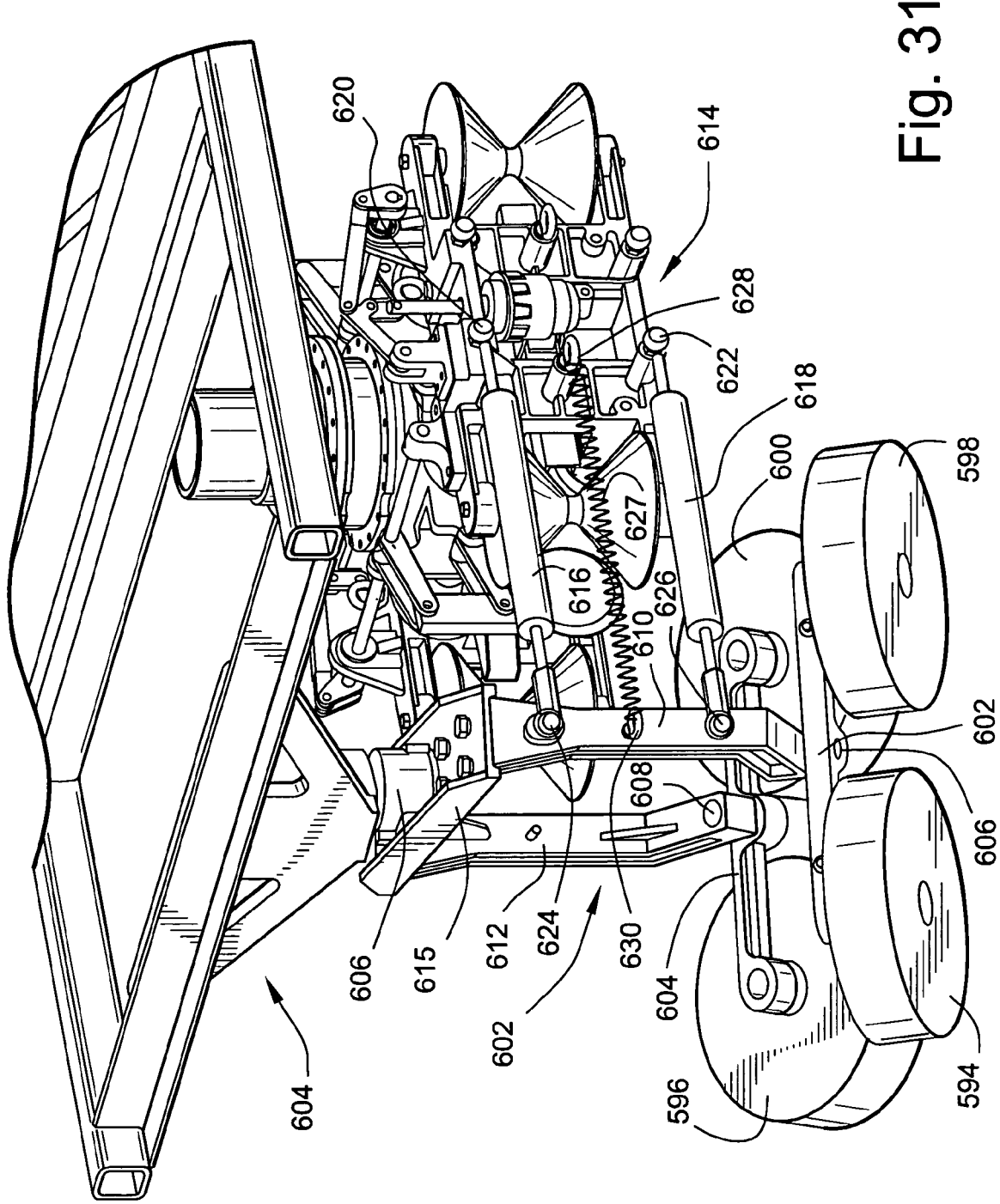
FIG. 31 is a partial perspective view of a traveling sprinkler with a steerable guide wheel assembly in accordance with another embodiment of the invention.

With reference now to FIG. 31, the two pair of forward guide wheels 594, 596 and 598, 600 are mounted on a steering frame assembly 602 that is, in turn, secured to the cart frame 604 by means of a pivot bearing 606. This arrangement allows the steering frame assembly and guide wheels to freely pivot about the pivot bearing, facilitating movement of the cart about sharp curves in the water supply pipe. In addition, each pair of guide wheels 594, 598 and 596, 600 are secured to respective brackets 602, 604 which are, in turn, pivotally secured via pins or bolts 606, 608 to steering frame assembly components 610, 612. The guide wheel pairs are thus free to pivot about the pins or bolts 606, 608 to accommodate surface irregularities in the supply pipe.

In this embodiment, the docking station 614 is suspended from the cart frame by four vertically-arranged coil springs (not shown) as described above. Alternatively, the vertically-oriented springs could extend between the docking station 614 and a pair of laterally-spaced parallel rods (not shown) extending rearwardly from the steering frame assembly component 615. The tie rods 616, 618 extend from the docking station bushing mounts 620, 622 to similar mounts 624, 626 on the steering frame assembly component 610. An additional horizontally-oriented coil spring 627 extends from the eyebolt 628 on the docking station to a similar eyebolt 630 on the steering frame assembly component 610. This same suspension modification appears on the opposite side of the docking station as well. This arrangement results in a spring-biased directional change in the docking station as the cart wheels pivot about the pivot bearing 606.

Finally, the invention is not limited to crop irrigation. For example, the traveling sprinkler may also be used to suppress dust in grain storage, road projects and the like. It may also be used for chemical leaching operations, as well as for fire prevention and/or suppression.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A docking station module for fluidly connecting a sprinkler on a mobile irrigation apparatus to a stationary hydrant water supply valve mounted on a water supply pipe, the module comprising a frame; a hydrant valve actuator in fluid communication with a hose adapted to feed water from the hydrant water supply valve to a sprinkler, said hydrant valve actuator resiliently suspended from said frame for floating movement in at least three mutually substantially perpendicular directions relative to said frame and to said hydrant water supply valve.

2. The docking station module of claim 1 wherein said hydrant valve actuator is suspended from the frame by a plurality of vertically-oriented springs.

3. The docking station module of claim 2 wherein said plurality of springs comprise four coil springs.

4. The docking station module of claim 1 wherein said hydrant valve actuator is sandwiched between a pair of housings, said housings each supporting at least one pair of vertically aligned cooperating guide wheels for rotation about parallel horizontal axes, a pair of axially spaced forward and rearward rollers for rotation about parallel vertical axes, an inwardly-facing open channel member, and a side guide roller projecting through an aperture in said open channel member.

5. The docking station module of claim 4 wherein each housing supports a second pair of vertically aligned cooperating guide wheels for rotation about parallel horizontal axes.

6. The docking station module of claim 5 wherein said first and second pair of cooperating guide wheels, said pair of axially spaced forward and rearward rollers, said inwardly-facing open channel member and said side guide roller of each housing together define a docking space adapted to receive a horizontally oriented flange on each of said hydrants.

7. The docking station module of claim 4 wherein said axially spaced, forward and rearward rollers are substantially hourglass-shaped.

8. The docking station module of claim 1 wherein said frame supports a portable power supply for driving the mobile irrigation apparatus.

9. The docking station module of claim 8 wherein said power supply comprises a pair of 12-volt batteries.

10. The docking station module of claim 1 wherein said frame mounts a first pair of substantially vertically-oriented guide wings on respective opposite sides of said docking station, extending forward of and angling laterally away from said docking station.

11. The docking station module of claim 10 wherein said frame mounts a second pair of substantially vertically-oriented guide wings on respective opposite sides of said docking station, extending rearward of and angling laterally away from said docking station.

12. The docking station module of claim 11 and further including a first substantially horizontally-oriented guide wing extending forwardly of, and angling upwardly away from, said docking station.

13. The docking station module of claim 12 and further including a second substantially horizontally-oriented guide wing extending rearwardly of, and angling upwardly away from, said docking station.

14. The docking station module of claim 1 wherein said hydrant valve actuator comprises a plunger adapted to move into and out of the hydrant water supply valve.

15. The docking station module of claim 14 and further comprising at least one pressure accumulator tank carried on the mobile irrigation apparatus and fluidly connected to said hydrant valve actuator for supplying water under pressure to a chamber above said plunger, thereby moving said plunger downwardly into the hydrant to open said water supply valve.

16. The docking station module of claim 15 wherein the pressure accumulator is adapted to be refilled with water from the water supply pipe.

17. The docking station module of claim 16 wherein each of said docking stops is driven by a respective actuator.

18. A docking station module for fluidly connecting a mobile irrigation apparatus to a stationary hydrant water supply valve mounted on a water supply pipe, the module comprising a hydrant valve actuator resiliently suspended from a frame for floating movement in at least three mutually substantially perpendicular directions relative to the hydrant water supply valve;
   wherein said hydrant valve actuator is suspended from the frame by a plurality of vertically-oriented springs; and
   wherein said module includes a housing and at least one pair of resiliently substantially horizontally-oriented, compressible tie rods that are connected by means of universal bushings between said frame and said housing.

19. The docking station module of claim 18 wherein at least one pair of resiliently substantially horizontally-oriented, compressible tie rods are connected by means of universal bushings between said frame and said hydrant valve actuator.

20. The docking station module of claim 19 wherein said at least one pair of tie rods comprises two pair of tie rods, one pair on each of two opposite sides of the hydrant valve actuator.

21. A docking station module for fluidly connecting a mobile irrigation apparatus to a stationary hydrant water supply valve mounted on a water supply pipe, the module comprising a hydrant valve actuator resiliently suspended from a frame for floating movement in at least three mutually substantially perpendicular directions relative to the hydrant water supply valve; and
wherein said hydrant valve actuator is attached to a housing, said housing provided with a tapered shroud extending forward of the housing for guiding the docking station module into alignment with the hydrant water supply valve.

22. The docking station module of claim 21 wherein at least one docking stop is pivotally secured to a rearward end of said housing for movement between retracted and extended positions such that, in use, and when in said extended position, said docking stop will be engaged by the water supply valve, causing the mobile irrigation apparatus to stop.

23. The docking station module of claim 22 wherein a docking stop limit switch is mounted on said rearward end of said housing and adapted for engagement by said water supply valve, said docking stop limit switch located forward of said docking stop such that tripping of said limit switch by said water supply valve will cause said docking stop to be moved from said retracted to said extended position.

24. The docking station module of claim 22 wherein a second docking stop is pivotally secured to a forward end of said housing for movement between retracted and extended positions.

25. A traveling sprinkler apparatus comprising:
a cart adapted for movement along a path defined by water supply pipe having a plurality of spaced hydrants thereon;
a sprinkler mounted on said cart;
a power source carried on the cart for moving the cart along the path;
a docking station including a housing having a body portion and a valve actuator adapted for successively engaging the plurality of spaced hydrants, and for opening valves contained in said hydrants, said docking station resiliently suspended from said cart for substantially free-floating movement relative to said cart and to said hydrants; and
a hose operatively connected between said valve actuator and said sprinkler.

26. The traveling sprinkler of claim 25 wherein the cart includes a substantially rigid frame, said docking station resiliently suspended from said frame by a plurality of vertically arranged coil springs.

27. The traveling sprinkler of claim 26 wherein at least one pair of resiliently substantially horizontally-oriented, compressible tie rods are connected between said frame and said housing, using universal bushings to permit said floating movement.

28. The traveling sprinkler of claim 27 wherein at least one pair of tie rods comprises two pair of tie rods, one pair on each of two opposite sides of the hydrant valve actuator.

29. The traveling sprinkler of claim 28 wherein said two pair of tie rods are secured between said frame and said housing by universal bushings.

30. The traveling sprinkler of claim 26 wherein said frame mounts a first pair of substantially vertically-oriented guide wings on respective opposite sides of said docking station, extending forward of and angling laterally away from said docking station.

31. The traveling sprinkler of claim 30 wherein said frame mounts a second pair of substantially vertically-oriented guide wings on respective opposite sides of said docking station, extending rearward of and angling laterally away from said docking station.

32. The traveling sprinkler of claim 31 and further including a first substantially horizontally-oriented guide wing extending forwardly of and angling upwardly away from said docking station.

33. The traveling sprinkler of claim 32 and further including a second substantially horizontally-oriented guide wing extending rearwardly of and angling upwardly away from said docking station.

34. The traveling sprinkler of claim 25 wherein said housing includes a pair of housings, and said hydrant valve actuator is sandwiched between said pair of housings, said pair of housings each supporting at least one pair of vertically aligned cooperating guide wheels for rotation about parallel horizontal axes, a pair of axially spaced forward and rearward rollers for rotation about parallel vertical axes, an inwardly-facing open channel member, and a side guide roller projecting through an aperture in said open channel member.

35. The traveling sprinkler of claim 25 wherein said housing includes a pair of housings, each of said pair of housings support two pair of cooperating guide wheels for rotation about horizontal axes, and adapted to engage upper and lower surfaces of a flange on each of said hydrants.

36. The traveling sprinkler of claim 35 and further comprising at least one pair of laterally-spaced, hour-glass-shaped guide rollers mounted on said body portion for rotation about substantially vertical axes, and adapted to engage side surfaces of said flange.

37. The traveling sprinkler of claim 25 wherein said power source comprises a pair of batteries supported on said frame.

38. The traveling sprinkler of claim 37 wherein said pair of batteries are 12-volt batteries.

39. The traveling sprinkler of claim 25 wherein at least one docking stop is pivotally secured to a rearward end of said housing for movement between retracted and extended positions such that, in use, and when in said extended position, said docking stop will be engaged by the water supply valve, causing the cart to stop.

40. The traveling sprinkler of claim 39 wherein a docking stop proximity switch is mounted on said at least one docking stop, said proximity switch located at a forward end of said docking stop such that tripping of said proximity switch by approach of said water supply valve will cause power to said cart to be cut.

41. The traveling sprinkler of claim 25 including a PLC carried on the cart and adapted to control movement of the cart and operation of the sprinkler.

42. The traveling sprinkler of claim 25 wherein said cart includes a pair of drive wheels operatively connected to said power source; and at least one pair of guide wheels
adapted to follow the water supply pipe.

43. The traveling sprinkler of claim 42 wherein said guide wheels rotate about axles arranged at an acute angle relative to horizontal.

44. The traveling sprinkler of claim 25 including a tapered shroud extending forwardly of said housing.

45. The traveling sprinkler of claim 25 wherein said docking station includes a first frame, said docking station and said first frame supported for lateral movement on a pair of horizontal rails extending between side rails of the cart.

46. The traveling sprinkler of claim 45 wherein said docking station is normally resiliently centered along said pair of horizontal rails.

47. The traveling sprinkler of claim 25 and further comprising at least one pressure accumulator tank carried on the mobile irrigation apparatus and fluidly connected to said hydrant valve actuator for supplying water under pressure to a chamber above said plunger, thereby moving said plunger downwardly into the hydrant to open said water supply valve.

48. The traveling sprinkler of claim 47 wherein the pressure accumulator is adapted to be refilled with water from the water supply pipe.

49. The traveling sprinkler of claim 39 wherein a second docking stop is pivotally secured to a forward end of said housing for movement between retracted and extended positions.

50. The traveling sprinkler of claim 46 wherein said hydrant valve actuator comprises a plunger adapted to move into and out of the hydrant water supply valve.

51. The traveling sprinkler of claim 50 and further comprising at least one pressure accumulator tank carried on the mobile irrigation apparatus and fluidly connected to said hydrant valve actuator for supplying water under pressure to a chamber above said plunger, thereby moving said plunger downwardly into the hydrant to open said water supply valve.

52. The traveling sprinkler of claim 51 wherein the pressure accumulator is adapted to be refilled with water from the water supply pipe.

53. The traveling sprinkler of claim 25 wherein the cart includes a substantially rigid frame and wherein said docking station is resiliently suspended from a docking station supporting frame movable relative to said rigid frame in a direction transverse to said path.

54. The traveling sprinkler of claim 53 wherein said rigid frame includes a pair of rigid rails and said docking station supporting frame is provided with rollers engaged with said rails for permitting rolling movement of said docking station in opposite directions along said rails.

55. The traveling sprinkler of claim 54 wherein said docking station and said docking station supporting frame are resiliently centered along said rails.

56. An automatic traveling sprinkler comprising:
a cart including a cart frame; a plurality of wheels attached to said cart frame, including a pair of drive wheels for moving said cart between a plurality of water supply valves projecting upwardly from a water supply pipe; a power supply supported on said cart frame and operatively connected to said pair of drive wheels; a sprinkler mounted on said cart frame; a floating docking station resiliently suspended from said cart frame for movement in plural directions relative to said cart frame, said docking station supporting a valve actuator adapted to engage and open one of said water supply valves when said docking station has aligned said valve-actuating cylinder with said one water supply valve; and a hose extending between said valve-actuating cylinder and said sprinkler.

57. The automatic traveling sprinkler of claim 56 wherein said power supply comprises a pair of 12-volt batteries.

58. The automatic traveling sprinkler of claim 56 wherein a plunger within said valve actuator is adapted to engage and open said water supply valve.

59. The automatic traveling sprinkler of claim 56 wherein the water supply pipe is above ground, and said plurality of wheels include at least one pair of guide wheels adapted to engage and follow the water supply pipe.

60. The automatic traveling sprinkler of claim 56 wherein said at least one pair of guide wheels comprises two pairs of guide wheels, one pair adjacent the other, at a forward end of said cart.

61. The automatic traveling sprinkler of claim 60 wherein said two pairs of guide wheels have respective axes of rotation arranged at opposite acute angles relative to ground.

62. The automatic traveling sprinkler of claim 61 wherein said opposite acute angles are between about 30°-45°.

63. The automatic traveling sprinkler of claim 57 wherein said drive wheels are operatively connected through a transverse drive shaft to a gearbox motor powered by said pair of 12-volt batteries.

64. The automatic traveling sprinkler of claim 56 and further comprising a programmable logic controller supported on said cart frame for controlling movement of said cart, and operation of said sprinkler and said valve-actuating cylinder.

65. The automatic traveling sprinkler of claim 56 wherein said docking station includes a housing and a tapered shroud for guiding the docking station into alignment with the water supply valve.

66. The automatic traveling sprinkler of claim 56 wherein at least one docking stop is pivotally secured to a rearward end of said housing for movement between retracted and extended positions such that, when in said extended position, said docking stop will be engaged by the water supply valve, causing the cart to stop.

67. The automatic traveling sprinkler of claim 66 wherein a docking stop proximity switch is mounted on said docking stop, said proximity switch mounted on a forward end of said docking stop such that tripping of said proximity switch by approach of said water supply valve will cause power to said cart to be cut.

68. The automatic traveling sprinkler of claim 66 wherein a fluid actuator is operatively connected to said at least one docking stop by a plurality of links.

69. The automatic traveling sprinkler of claim 68 wherein said at least one docking stop is secured to a shaft rotatably supported on said rearward end of said housing, a drive link on said shaft connected to said plurality of links.

70. The automatic traveling sprinkler of claim 56 wherein said docking station is resiliently suspended from said cart by a plurality of tie rods and a plurality of elongated coil springs.

71. An automatic sprinkler comprising a wheeled cart having a frame and an electromechanical drive thereon for moving the cart along a path defined by a plurality of spaced water supply valves; a docking station mounted on said frame for free-floating movement in at least three mutually perpendicular directions relative to said frame and adapted to align with and engage, successively, individual ones of said plurality of water supply valves as the cart approaches the water supply valves, wherein the docking station supports a valve actuator having a plunger operable to open the water supply valve; and a pressure accumulator supported on said cart frame and arranged to supply the valve actuator with water under pressure.

72. An automatic traveling sprinkler comprising:
a cart including a cart frame; a plurality of wheels attached to said cart frame, including a pair of drive wheels for moving said cart between a plurality of water supply valves projecting inwardly from a water supply pipe; a power supply supported on said cart frame and operatively connected to said pair of drive wheels; a sprinkler mounted on said cart frame; and a floating docking station resiliently suspended from said cart frame for limited movement in plural directions relative to said cart frame, said docking station supporting a valve-actuating cylinder adapted to engage and open one of said water supply valves when said docking station has aligned said valve-actuating cylinder with said one water supply valve; wherein said docking station includes a housing and a tapered shroud for guiding the docking station into alignment with the water supply valve; and wherein said docking station is resiliently suspended from said cart for free-floating movement relative to said cart.

73. An automatic traveling sprinkler comprising a cart; first means on the cart for moving the cart along a path defined by a water supply pipe; second means for aligning with, engaging and actuating, successively, a plurality of water supply valves arranged along the pipe; a sprinkler mounted on the cart and in fluid communication with said second means; and third means mounted on said cart for controlling operation of said first and second means.

74. A method of operating a water supply valve actuator carried on a wheeled mobile irrigation cart having at least one sprinkler thereon comprising:
  (a) moving the wheeled mobile irrigation cart to a position where the water supply valve actuator is aligned directly over a water supply valve supported on a water supply pipe;
  (b) driving a valve actuator component downwardly into the water supply valve to open the water supply valve, using water under pressure stored in at least one pressure accumulator supported on the wheeled mobile irrigation cart, thereby permitting water to flow to the sprinkler through a hose converted to the water supply valve actuator;
  (c) after a predetermined time interval, halting flow of water to the sprinkler and recharging said at least one pressure accumulator with water from the water supply pipe; then
  (d) withdrawing the valve actuator component from the water supply valve; and
  (e) moving the wheeled mobile irrigation cart to another water supply valve on the water supply pipe.

75. A method of operating a water supply valve actuator carried on a wheeled mobile irrigation cart having at least one sprinkler thereon comprising:
  (a) moving the wheeled mobile irrigation cart to a position where the water supply valve actuator is aligned directly over a water supply supported on a water supply pipe;
  (b) driving a valve actuator component downwardly into the water supply valve to open the water supply valve, using water in a pressure accumulator mounted in the wheeled mobile irrigation cart obtained from a previously opened water supply valve to thereby feed water through a hose converted to said water supply valve actuator to said sprinkler; and
  (c) before withdrawing the valve actuator component, recharging the pressure accumulator with water for use in opening the next water supply valve to be opened.

* * * * *